United States Patent
Zhang et al.

(10) Patent No.: US 10,952,275 B2
(45) Date of Patent: Mar. 16, 2021

(54) METHOD AND APPARATUS FOR CONTROLLING RADIO RESOURCE CONTROL (RRC) STATE OF MOBILE DEVICE

(71) Applicant: HUAWEI TECHNOLOGIES CO., LTD., Guangdong (CN)

(72) Inventors: Hongping Zhang, Shanghai (CN); Qinghai Zeng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/188,213

(22) Filed: Nov. 12, 2018

(65) Prior Publication Data

US 2019/0082490 A1    Mar. 14, 2019

Related U.S. Application Data

(63) Continuation of application No. PCT/CN2017/084180, filed on May 12, 2017.

(30) Foreign Application Priority Data

May 13, 2016  (CN) .......................... 201610322124.0

(51) Int. Cl.
*H04W 76/27* (2018.01)
*H04W 76/20* (2018.01)
(Continued)

(52) U.S. Cl.
CPC .......... *H04W 76/27* (2018.02); *H04W 48/08* (2013.01); *H04W 48/16* (2013.01); *H04W 76/20* (2018.02)

(58) Field of Classification Search
CPC ..... H04W 48/08; H04W 48/16; H04W 76/20; H04W 76/27
See application file for complete search history.

(56) References Cited

U.S. PATENT DOCUMENTS 9,088,616 B2* 7/2015 Bi .......................... H04W 12/06
2012/0093086 A1* 4/2012 Yin ......................... H04L 69/16
370/328
(Continued)

FOREIGN PATENT DOCUMENTS

CN    102378120 A    3/2012
CN    103338500 A    10/2013
(Continued)

OTHER PUBLICATIONS

Nokia Networks,"Solution: Mobility Framework",SA WG2 Meeting #S2-113ah S2-161323,23—Feb. 26, 2016, Sophia Antipolis, FR,total 5 pages.

*Primary Examiner* — Kashif Siddiqui
(74) *Attorney, Agent, or Firm* — Huawei Technologies Co., Ltd.

(57) ABSTRACT

This application provides method and apparatus for RRC state control. An access network device obtains RRC connected inactive state indication information of UE. When the UE leaves an RRC connected state, the access network device determines, based on the RRC connected inactive state indication information, that the UE enters an RRC connected inactive state or an RRC idle state, so that the access network device can control, based on a state of the UE, the UE to enter an appropriate RRC state, thereby reducing signaling overheads and improving system performance.

21 Claims, 9 Drawing Sheets

(51) Int. Cl.
*H04W 48/08* (2009.01)
*H04W 48/16* (2009.01)

(56) References Cited

U.S. PATENT DOCUMENTS

| | | | |
|---|---|---|---|
| 2012/0100823 A1* | 4/2012 | Chen | H04W 4/08 |
| | | | 455/404.1 |
| 2012/0250578 A1 | 10/2012 | Pani et al. | |
| 2012/0281566 A1 | 11/2012 | Pelletier et al. | |
| 2013/0260811 A1 | 10/2013 | Rayavarapu | |
| 2015/0003361 A1 | 1/2015 | Palat et al. | |
| 2015/0365897 A1 | 12/2015 | Hu et al. | |
| 2016/0029343 A1 | 1/2016 | Quan et al. | |
| 2016/0212760 A1 | 7/2016 | Iwai | |
| 2016/0309379 A1* | 10/2016 | Pelletier | H04W 76/27 |
| 2017/0013515 A1* | 1/2017 | Bangolae | H04W 52/0235 |
| 2018/0255597 A1* | 9/2018 | Yu | H04W 16/18 |
| 2019/0037459 A1 | 1/2019 | Pelletier et al. | |

FOREIGN PATENT DOCUMENTS

| | | |
|---|---|---|
| CN | 103945503 A | 7/2014 |
| CN | 105898894 A | 8/2016 |
| JP | 2014514831 A | 6/2014 |
| JP | 2016527848 A | 9/2016 |
| JP | 2016540441 A | 12/2016 |
| RU | 2573577 C1 | 1/2016 |
| WO | 2015063970 A1 | 5/2015 |
| WO | 2015085273 A1 | 6/2015 |
| WO | 2015171984 A1 | 11/2015 |

* cited by examiner

METHOD AND APPARATUS FOR CONTROLLING RADIO RESOURCE CONTROL (RRC) STATE OF MOBILE DEVICE

CROSS-REFERENCE TO RELATED APPLICATIONS

This application is a continuation of International Application No. PCT/CN2017/084180, filed on May 12, 2017, which claims priority to Chinese Patent Application No. 201610322124.0, filed on May 13, 2016. The disclosures of the aforementioned applications are hereby incorporated by reference in their entireties.

TECHNICAL FIELD

This application relates to communications technologies, and in particular, to method and apparatus for radio resource control (RRC) state control.

BACKGROUND in a long term evolution (LTE) system, two RRC states: RRC idle (an idle state) and RRC connected (a connected state), are defined for user equipment (UE). When the UE needs to perform a service, the UE needs to set up an RRC connection to a network, to be specific, switch from the idle state to the connected state, before performing service data transmission.

In a process in which the UE switches from the idle state to the connected state, relatively high signaling overheads am generated, and a switching time is excessively long, leading to an excessively high transmission delay. A next-generation network is an upgrade version of the LTE system, and can provide a higher transmission rate than that of the LTE system, and the next-generation network is also referred to as 5G. In the next-generation network, UE also has an RRC idle state and an RRC connected state. In a process in which the LE switches from the idle state to the connected state, relatively high signaling overheads are also generated, and a switching time is excessively long. As a result, advantages of the next-generation network cannot be leveraged.

SUMMARY

This application provides method and apparatus for RRC state control, to control, based on a state of UE, the UE to enter an appropriate RRC state, thereby reducing signaling overheads and improving system performance.

A first aspect of this application provides a method for RRC state control, including: obtaining, by an access network device, RRC connected inactive state indication information of UE, where the RRC connected inactive state indication information is used to indicate whether it is suitable for the UE to enter an RRC connected inactive state, and an RRC state of the UE includes at least an RRC connected state, the RRC connected inactive state, and an RRC idle state; when the UE leaves the RRC connected state, determining, by the access network device based on the RRC connected inactive state indication information, that the UE enters the RRC connected inactive state or the RRC idle state; and when the access network device determines that the UE enters the RRC connected inactive state, storing, by the access network device, context information of the UE, and sending, to the UE, a command of entering the RRC connected inactive state. According to the method, the access network device can control, based on a state of the UE, the UE to enter an appropriate RRC state, thereby reducing signaling overheads and improving system performance.

Optionally, the access network device obtains RRC connected inactive state indication information of at least one of a bearer, a network slice, and a service flow that are set up by the UE. Correspondingly, the access network device determines, based on the RRC connected inactive state indication information of the at least one of the bearer, the network slice, and the service flow that are set up by the UE, whether it is suitable for the UE to enter the RRC connected inactive state. The access network device controls, based on the RRC connected inactive state indication information of the bearer, the network slice, and the service flow of the UE, the UE to enter an appropriate RRC state, thereby reducing a delay of data transmission performed through the bearer and the network slice, and improving system performance.

Optionally, the access network device obtains RRC connected inactive state indication information of at least one of a bearer, a network slice, and a service flow that are set up by the UE, and obtains RRC connected inactive state indication information of a device granularity of the UE, where the RRC connected inactive state indication information of the device granularity is used to indicate whether all bearers, network slices, and service flows of the UE are suitable for entering the RRC connected inactive state.

Correspondingly, the access network device first determines, based on the RRC connected inactive state indication information of the device granularity, whether it is suitable for the UE to enter the RRC connected inactive state. When the RRC connected inactive state indication information of the device granularity indicates that the UE is suitable for the RRC connected inactive state, the access network device determines that the UE enters the RRC connected inactive state. Alternatively, when the RRC connected inactive state indication information of the device granularity indicates that the UE is unsuitable for the RRC connected inactive state, the access network device determines, based on the RRC connected inactive state indication information of the at least one of the bearer, the network slice, and the service flow that are set up by the UE, whether it is suitable for the UE to enter the RRC connected inactive state.

Specifically, that the access network device determines, based on the RRC connected inactive state indication information of the at least one of the bearer, the network slice, and the service flow that are set up by the UE, whether it is suitable for the UE to enter the RRC connected inactive state includes: determining, by the access network device, whether RRC connected inactive state indication information of at least one bearer, network slice, or service flow in the bearer, the network slice, and the service flow that are set up by the UE indicates that the corresponding bearer, network slice, or service flow is suitable for the RRC connected inactive state; and when at least one bearer, network slice, or service flow in the bearer, the network slice, and the service flow that are set up by the UE is suitable for the RRC connected inactive state, determining, by the access network device, that the UE enters the RRC connected inactive state; or when none of the bearer, the network slice, and the service flow that are set up by the UE is suitable for the RRC connected inactive state, determining, by the access network device, that the UE enters the RRC idle state.

Optionally, the access network device obtains RRC connected inactive state indication information of a device granularity of the UE. When the RRC connected inactive state indication information of the device granularity indicates that the UE is suitable for the RRC connected inactive state, the access network device determines that the UE enters the RRC connected inactive state; or when the RRC connected inactive state indication information of the device granularity indicates that the UE is unsuitable for the RRC connected inactive state, the access network device determines that the UE enters the RRC idle state.

Optionally, the access network device obtains, in the following manner, the RRC connected inactive state indication information of the at least one of the bearer, the network slice, and the service flow that are set up by the UE:

The access network device receives the RRC connected inactive state indication information that is sent by a core network and that is of the at least one of the bearer, the network slice, and the service flow of the UE, and stores the received RRC connected inactive state indication information of the bearer, the network slice, and the service flow of the UE. RRC connected inactive state indication information of the bearer is included in a bearer addition request message sent by the core network to the access network device, RRC connected inactive state indication information of the network slice is included in a network slice addition request message sent by the core network to the access network device, and RRC connected inactive state indication information of the service flow is included in a service flow addition request message sent by the core network to the access network device.

Alternatively, the access network device receives the RRC connected inactive state indication information that is sent by the UE and that is of the at least one of the bearer, the network slice, and the service flow of the UE, and stores the received RRC connected inactive state indication information of the bearer, the network slice, and the service flow of the UE. RRC connected inactive state indication information of the bearer is included in a bearer addition complete message sent by the UE to the access network device, RRC connected inactive state indication information of the network slice is included in a network slice addition complete message sent by the UE to the access network device, and RRC connected inactive state indication information of the service flow is included in a service flow addition complete message sent by the UE to the access network device.

Optionally, the access network device obtains the RRC connected inactive state indication information of the device granularity of the UE in the following manner:

The access network device receives and stores the RRC connected inactive state indication information that is of the device granularity and that is sent by a core network. Specifically, the RRC connected inactive state indication information of the device granularity may be included in an initial context setup request message sent by the UE to the access network device.

Alternatively, the access network device receives and stores the RRC connected inactive state indication information that is of the device granularity and that is sent by the UE. Specifically, the RRC connected inactive state indication information of the device granularity may be included in an RRC connection setup complete message sent by the UE to the access network device.

Further, the method further includes: obtaining, by the access network device, paging information of the UE, where the paging information includes a UE paging identity and information used to determine a paging occasion of the UE; after the UE enters the RRC connected inactive state, determining, by the access network device, the paging occasion of the UE based on the information used to determine the paging occasion of the UE; and sending a paging message to the UE on the determined paging occasion, where the paging message includes the UE paging identity (UE Paging Identity). The access network device actively pages the UE, to trigger the UE to enter the RRC connected state from the RRC connected inactive state, so that the RRC connected inactive state is transparent to the core network, signaling overheads are reduced, and coupling between the core network and the access network device is reduced.

Optionally, the UE paging identity is an access-stratum identity of the UE. The access-stratum identity of the UE includes a resumed identifier (Resumed ID), a cell radio network temporary identifier (C-RNTI), a combination of an E-UTRAN cell global identifier (ECGI) and the C-RNTI, or a combination of a physical cell identifier (PCI) and the C-RNTI.

Optionally, after sending the paging message to the UE, the access network device further sends a paging request message to a neighboring access network device, where the paging request message is used to request the neighboring access network device to page the UE, and the paging request message includes the paging information of the UE.

Optionally, the paging message includes a UE identity type, and the UE identity type is used to identify that the UE paging identity is the access-stratum identity.

Optionally, when the UE paging identity is not an access-stratum identity, the access network device requests the paging information of the UE from the core network or the UE, or the access network device receives the paging information of the UE sent by the core network or the UE.

Optionally, after the UE enters the RRC connected inactive state, when the access network device receives downlink data of the UE sent by the core network, the access network device determines, based on the downlink data of the UE, to send the paging message to the UE, so that the UE enters the RRC connected state from the RRC connected inactive state.

Optionally, before the determining, by the access network device based on the RRC connected inactive state indication information, that the UE enters the RRC connected inactive state or the RRC idle state, the method further includes:

determining, by the access network device, a reason for which the UE leaves the RRC connected state; and when the reason for which the UE leaves the RRC connected state is that the UE does not perform data transmission within a period of time, determining, by the access network device based on the RRC connected inactive state indication information, that the UE enters the RRC connected inactive state or the RRC idle state; or when the reason for which the UE leaves the RRC connected state is any one of the following reasons: the access network device receives a UE context release command sent by a core network, an S1 interface connection of the UE is released, and the access network device identifies that the UE is abnormal, determining, by the access network device, that the UE enters the RRC idle state.

A second aspect of this application provides a method for RRC state control, including:

sending, by UE, RRC connected inactive state indication information of the UE to an access network device; when the UE leaves an RRC connected state, receiving, by the UE, a command that is of entering an RRC connected inactive state and that is sent by the access network device, where the command of entering the RRC connected inactive state is sent by the access network device based on the RRC connected inactive state indication information of the UE; and controlling, by the UE according to the command of entering the RRC connected inactive state, the UE to enter the RRC connected inactive state, and storing context information of the UE.

Optionally, the RRC connected inactive state indication information of the UE includes at least one piece of the following information: RRC connected inactive state indication information of at least one of a bearer, a network slice, and a service flow that are set up by the UE, and RRC connected inactive state indication information of a device granularity of the UE.

After the UE enters the RRC connected inactive state, the method further includes:

determining, by the UE, a paging occasion of the UE, and receiving, on the determined paging occasion, a paging message sent by the access network device, where the paging message includes a UE paging identity, and the UE paging identity is an access-stratum identity of the UE; and initiating, by the UE to the access network device based on the paging message, a process of entering the RRC connected state. Optionally, the UE determines the paging occasion of the UE based on the access-stratum identity of the UE.

A third aspect of this application provides a method for RRC state control, including: determining, by a core network device based on information about UE, whether it is suitable for the UE to enter an RRC connected inactive state; and when determining that it is suitable for the UE to enter the RRC connected inactive state, sending, by the core network device, RRC connected inactive state indication information of the UE to an access network device.

Optionally, the information about the UE includes at least one piece of the following information: a type of the UE, subscription information of the UE, information about a bearer added for the UE, information about a network slice added for the UE, and information about a service flow added for the UE. The RRC connected inactive state indication information of the UE includes at least one piece of the following information: RRC connected inactive state indication information of at least one of a bearer, a network slice, and a service flow that are set up by the UE, and RRC connected inactive state indication information of a device granularity of the UE.

A fourth aspect of this application provides an access network device, and the access network device includes a first obtaining module, a first determining module, a sending module, and a storage module.

The first obtaining module is configured to obtain RRC connected inactive state indication information of UE, where the RRC connected inactive state indication information is used to indicate whether it is suitable for the UE to enter an RRC connected inactive state, and an RRC state of the UE includes at least an RRC connected state, the RRC connected inactive state, and an RRC idle state.

The first determining module is configured to: when the UE leaves the RRC connected state, determine, based on the RRC connected inactive state indication information, that the UE enters the RRC connected inactive state or the RRC idle state. The sending module is configured to: when the first determining module determines that the UE enters the RRC connected inactive state, send, to the UE, a command of entering the RRC connected inactive state. The storage module is configured to: after the sending module sends the command of entering the RRC connected inactive state, store context information of the UE.

Optionally, the first obtaining module is specifically configured to obtain RRC connected inactive state indication information of at least one of a bearer, a network slice, and a service flow that are set up by the UE. Correspondingly, the first determining module is specifically configured to determine, based on the RRC connected inactive state indication information of the at least one of the bearer, the network slice, and the service flow that are set up by the UE, whether it is suitable for the UE to enter the RRC connected inactive state.

Alternatively, the first obtaining module is specifically configured to: obtain RRC connected inactive state indication information of at least one of a bearer, a network slice, and a service flow that are set up by the UE, and obtain RRC connected inactive state indication information of a device granularity of the UE, where the RRC connected inactive state indication information of the device granularity is used to indicate whether all bearers, network slices, and service flows of the UE are suitable for entering the RRC connected inactive state. Correspondingly, the first determining module is specifically configured to: when the RRC connected inactive state indication information of the device granularity indicates that the UE is suitable for the RRC connected inactive state, determine that the UE enters the RRC connected inactive state; or when the RRC connected inactive state indication information of the device granularity indicates that the UE is unsuitable for the RRC connected inactive state, determine, based on the RRC connected inactive state indication information of the at least one of the bearer, the network slice, and the service flow that are set up by the UE, whether it is suitable for the UE to enter the RRC connected inactive state.

Alternatively, the first obtaining module is specifically to obtain only RRC connected inactive state indication information of a device granularity of the UE. Correspondingly, the first determining module is specifically configured to: when the RRC connected inactive state indication information of the device granularity indicates that the UE is suitable for the RRC connected inactive state, determine, by the access network device, that the UE enters the RRC connected inactive state; or when the RRC connected inactive state indication information of the device granularity indicates that the UE is unsuitable for the RRC connected inactive state, determine, by the access network device, that the UE enters the RRC idle state.

When determining, based on the RRC connected inactive state indication information of the at least one of the bearer, the network slice, and the service flow that are set up by the UE, whether it is suitable for the UE to enter the RRC connected inactive state, the first determining module determines whether RRC connected inactive state indication information of at least one bearer, network slice, or service flow in the bearer, the network slice, and the service flow that are set up by the UE indicates that the corresponding bearer, network slice, or service flow is suitable for the RRC connected inactive state; and when at least one bearer, network slice, or service flow in the bearer, the network slice, and the service flow that are set up by the UE is suitable for the RRC connected inactive state, determines that the UE enters the RRC connected inactive state; or when none of the bearer, the network slice, and the service flow that are set up by the UE is suitable for the RRC connected inactive state, determines that the UE enters the RRC idle state.

Optionally, the first obtaining module obtains the RRC connected inactive state indication information of the at least one of the bearer, the network slice, and the service flow of the UE in the following manner:

The first obtaining module receives the RRC connected inactive state indication information that is sent by a core network and that is of the at least one of the bearer, the network slice, and the service flow of the UE, and stores the received RRC connected inactive state indication information of the bearer, the network slice, and the service flow of the UE. Specifically, the first obtaining module receives at least one of a bearer addition request message, a network slice addition request message, and a service flow addition request message that are sent by the core network, where the bearer addition request message includes RRC connected inactive state indication information of an added bearer, the network slice addition request message includes RRC connected inactive state indication information of an added network slice, and the service flow addition request message includes RRC connected inactive state indication information of an added service flow.

Alternatively, the first obtaining module receives the RRC connected inactive state indication information that is sent by the UE and that is of the at least one of the bearer, the network slice, and the service flow of the UE, and stores the received RRC connected inactive state indication information of the bearer, the network slice, and the service flow of the UE. Specifically, the first obtaining module receives at least one of a bearer addition complete message, a network slice addition complete message, or a service setup complete message sent by the UE, where the bearer addition complete message includes RRC connected inactive state indication information of an added bearer, the network slice addition complete message includes RRC connected inactive state indication information of an added network slice, and the service setup complete message includes RRC connected inactive state indication information of an added service flow.

Optionally, the first obtaining module obtains the RRC connected inactive state indication information of the device granularity of the UE in the following manner.

The first obtaining module receives the RRC connected inactive state indication information that is of the device granularity and that is sent by a core network or the UE, and stores the RRC connected inactive state indication information of the device granularity. Specifically, the first obtaining module receives an initial context setup request message sent by the core network, where the initial context setup request message includes the RRC connected inactive state indication information of the device granularity. Alternatively, the first obtaining module receives an RRC connection setup complete message sent by the UE, where the RRC connection setup complete message includes the RRC connected inactive state indication information of the device granularity.

Optionally, the access network device further includes a fourth determining module. The fourth determining module is configured to determine a reason for which the UE leaves the RRC connected state. When the reason for which the UE leaves the RRC connected state is that the UE does not perform data transmission within a period of time, the first determining module determines, based on the RRC connected inactive state indication information, that the UE enters the RRC connected inactive state or the RRC idle state; or when the reason for which the UE leaves the RRC connected state is any one of the following reasons: the access network device receives a UE context release command sent by a core network, an S1 interface connection of the UE is released, and the access network device identifies abnormality, the first determining module is further configured to determine that the UE enters the RRC idle state.

Further, the access network device further includes a second obtaining module and a second determining module. The second obtaining module is configured to obtain paging information of the UE, where the paging information includes a UE paging identity and information used to determine a paging occasion of the UE. The second determining module is configured to: after the UE enters the RRC connected inactive state, determine the paging occasion of the UE based on the information used to determine the paging occasion of the UE. The sending module is configured to send a paging message to the UE on the determined paging occasion, where the paging message includes the UE paging identity.

Optionally, the UE paging identity is an access-stratum identity of the UE, and the access-stratum identity of the UE includes a resumed identifier, a C-RNTI, a combination of an ECGI and the C-RNTI, or a combination of a PCI and the C-RNTI.

Optionally, after sending the paging message to the UE, the sending module is further configured to send a paging request message to a neighboring access network device, where the paging request message is used to request the neighboring access network device to page the UE, and the paging request message includes the paging information of the UE.

Optionally, the paging message includes a UE identity type, and the UE identity type is used to identify that the UE paging identity is the access-stratum identity.

Optionally, the second obtaining module is specifically configured to: request the paging information of the UE from the core network or the UE, or receive the paging information of the UE sent by the core network or the UE.

Optionally, the access network device further includes a receiving module and a third determining module. The receiving module is configured to: after the UE enters the RRC connected inactive state, receive downlink data of the UE sent by the core network. The third determining module is configured to determine, based on the downlink data of the UE, to send the paging message to the UE, so that the UE enters the RRC connected state from the RRC connected inactive state.

A fifth aspect of this application provides UE, including a sending module, a receiving module, a control module, and a storage module. The sending module is configured to send RRC connected inactive state indication information of the UE to an access network device, where the RRC connected inactive state indication information is used to indicate whether it is suitable for the UE to enter an RRC connected inactive state, and an RRC state of the UE includes at least an RRC connected state, the RRC connected inactive state, and an RRC idle state.

The receiving module is configured to: when the UE leaves the RRC connected state, receive a command that is of entering the RRC connected inactive state and that is sent by the access network device, where the command of entering the RRC connected inactive state is sent by the access network device based on the RRC connected inactive state indication information of the UE.

The control module is configured to control, according to the command of entering the RRC connected inactive state, the UE to enter the RRC connected inactive state. The storage module is configured to: after the UE enters the RRC connected inactive state, store context information of the UE.

In this embodiment, the RRC connected inactive state indication information of the UE includes at least one piece of the following information: RRC connected inactive state indication information of at least one of a bearer, a network slice, and a service flow that are set up by the UE, and RRC connected inactive state indication information of a device granularity of the UE, and the RRC connected inactive state indication information of the device granularity is used to indicate whether all bearers, network slices, and service flows of the UE are suitable for entering the RRC connected inactive state.

Optionally, the UE further includes a determining module. The determining module is configured to determine a paging occasion of the UE. The receiving module is further configured to receive, on the paging occasion determined by the determining module, a paging message sent by the access network device, where the paging message includes a UE paging identity, and the UE paging identity is an access-stratum identity of the UE. The control module is further configured to initiate, to the access network device based on the paging message, a process of entering the RRC connected state. Specifically, the determining module determines the paging occasion of the UE based on the access-stratum identity of the UE.

A sixth aspect of this application provides a core network device, including a determining module and a sending module. The determining module is configured to determine, based on information about UE, whether it is suitable for the UE to enter an RRC connected inactive state, where an RRC state of the UE includes at least an RRC connected state, the RRC connected inactive state, and an RRC idle state.

The sending module is configured to: when the determining module determines that it is suitable for the UE to enter the RRC connected inactive state, send RRC connected inactive state indication information of the UE to an access network device, where the RRC connected inactive state indication information is used to indicate whether it is suitable for the UE to enter the RRC connected inactive state.

The information about the UE includes at least one piece of the following information: a type of the UE, subscription information of the UE, information about a bearer added for the UE, information about a network slice added for the UE, and information about a service flow added for the UE. The RRC connected inactive state indication information of the UE includes at least one piece of the following information: RRC connected inactive state indication information of at least one of a bearer, a network slice, and a service flow that are set up by the UE, and RRC connected inactive state indication information of a device granularity of the UE, and the RRC connected inactive state indication information of the device granularity is used to indicate whether all bearers, network slices, and service flows of the UE are suitable for entering the RRC connected inactive state.

A seventh aspect of this application provides an access network device, and the access network device includes a processor, a transmitter, a receiver, and a memory. The transmitter, the receiver, and the memory are connected to the processor by using a bus. The transmitter is configured to send data to other devices. The receiver is configured to receive data sent by other devices. The memory is configured to store a computer program. The processor is configured to execute the program stored in the memory, so that the access network device performs any method in the first aspect of this application. Specifically, the processor is configured to obtain RRC connected inactive state indication information of UE, where the RRC connected inactive state indication information is used to indicate whether it is suitable for the UE to enter an RRC connected inactive state, and an RRC state of the UE includes at least an RRC connected state, the RRC connected inactive state, and an RRC idle state.

The processor is further configured to: when the UE leaves the RRC connected state, determine, based on the RRC connected inactive state indication information, that the UE enters the RRC connected inactive state or the RRC idle state.

The transmitter is configured to: when it is determined that the UE enters the RRC connected inactive state, send, to the UE, a command of entering the RRC connected inactive state.

The memory is configured to store context information of the UE.

Optionally, the processor is specifically configured to: obtain RRC connected inactive state indication information of at least one of a bearer, a network slice, and a service flow that are set up by the UE, and determine, based on the RRC connected inactive state indication information of the at least one of the bearer, the network slice, and the service flow that are set up by the UE, whether RRC connected inactive state indication information of at least one bearer, network slice, or service flow in the bearer, the network slice, and the service flow that are set up by the UE indicates that the corresponding bearer, network slice, or service flow is suitable for the RRC connected inactive state; and when at least one bearer, network slice, or service flow in the bearer, the network slice, and the service flow that are set up by the UE is suitable for the RRC connected inactive state, determine that the UE enters the RRC connected inactive state; or when none of the bearer, the network slice, and the service flow that are set up by the UE is suitable for the RRC connected inactive state, determine that the UE enters the RRC idle state.

Optionally, the processor is specifically configured to: obtain RRC connected inactive state indication information of at least one of a bearer, a network slice, and a service flow that are set up by the UE, and obtain RRC connected inactive state indication information of a device granularity of the UE, where the RRC connected inactive state indication information of the device granularity is used to indicate whether all bearers, network slices, and service flows of the UE are suitable for entering the RRC connected inactive state; and when the RRC connected inactive state indication information of the device granularity indicates that the UE is suitable for the RRC connected inactive state, determine that the UE enters the RRC connected inactive state; or when the RRC connected inactive state indication information of the device granularity indicates that the UE is unsuitable for the RRC connected inactive state, determine, based on the RRC connected inactive state indication information of the at least one of the bearer, the network slice, and the service flow that are set up by the UE, whether RRC connected inactive state indication information of at least one bearer, network slice, or service flow in the bearer, the network slice, and the service flow that are set up by the UE indicates that the corresponding bearer, network slice, or service flow is suitable for the RRC connected inactive state; and when at least one bearer, network slice, or service flow in the bearer or the network slice set up by the UE is suitable for the RRC connected inactive state, determine that the UE enters the RRC connected inactive state; or when none of the bearer, the network slice, and the service flow that are set up by the UE is suitable for the RRC connected inactive state, determine that the UE enters the RRC idle state.

Optionally, the processor is specifically configured to:
obtain RRC connected inactive state indication information of a device granularity of the UE, where the RRC connected inactive state indication information of the device granularity is used to indicate whether all bearers, network slices, and service flows of the UE are suitable for entering the RRC connected inactive state; and when the RRC connected inactive state indication information of the device granularity indicates that the UE is suitable for the RRC connected inactive state, determine that the UE enters the RRC connected inactive state; or when the RRC connected inactive state indication information of the device granularity indicates that the UE is unsuitable for the RRC connected inactive state, determine that the UE enters the RRC idle state.

Optionally, the receiver is further configured to receive at least one of a bearer addition request message, a network slice addition request message, and a service flow addition request message that are sent by a core network, where the bearer addition request message includes RRC connected inactive state indication information of an added bearer, the network slice addition request message includes RRC connected inactive state indication information of an added network slice, and the service flow addition request message includes RRC connected inactive state indication information of an added service flow.

Alternatively, the receiver receives at least one of a bearer addition complete message, a network slice addition complete message, or a service setup complete message sent by the UE, where the bearer addition complete message includes RRC connected inactive state indication information of an added bearer, the network slice addition complete message includes RRC connected inactive state indication information of an added network slice, and the service setup complete message includes RRC connected inactive state indication information of an added service flow.

Optionally, the receiver is further configured to receive an initial context setup request message sent by a core network, where the initial context setup request message includes the RRC connected inactive state indication information of the device granularity.

Alternatively, the receiver receives an RRC connection setup complete message sent by the UE, where the RRC connection setup complete message includes the RRC connected inactive state indication information of the device granularity.

Further, the processor is further configured to: obtain paging information of the UE, where the paging information includes a UE paging identity and information used to determine a paging occasion of the UE; and after the UE enters the RRC connected inactive state, determine the paging occasion of the UE based on the information used to determine the paging occasion of the UE.

Correspondingly, the transmitter is configured to send a paging message to the UE on the determined paging occasion, where the paging message includes the UE paging identity.

Optionally, the UE paging identity is an access-stratum identity of the UE, and the access-stratum identity of the UE includes a resumed identifier, a cell radio network temporary identifier C-RNTI, a combination of an E-UTRAN cell global identifier ECGI and the C-RNTI, or a combination of a physical cell identifier PCI and the C-RNTI.

Optionally, the receiver is further configured to: after the UE enters the RRC connected inactive state, receive downlink data of the UE sent by the core network; and the transmitter is further configured to determine, based on the downlink data of the UE, to send the paging message to the UE, so that the UE enters the RRC connected state from the RRC connected inactive state.

Optionally, the processor is further configured to:
determine a reason for which the UE leaves the RRC connected state; and when the reason for which the UE leaves the RRC connected state is that the UE does not perform data transmission within a period of time, determine, based on the RRC connected inactive state indication information, that the UE enters the RRC connected inactive state or the RRC idle state; or when the reason for which the UE leaves the RRC connected state is any one of the following reasons: the access network device receives a UE context release command sent by a core network, an S1 interface connection of the UE is released, and the access network device identifies that the UE is abnormal, determine that the UE enters the RRC idle state.

An eighth aspect of this application provides UE, and the UE includes a processor, a transmitter, a receiver, and a memory. The transmitter, the receiver, and the memory am connected to the processor by using a bus. The transmitter is configured to send data to other devices. The receiver is configured to receive data sent by other devices. The memory is configured to store a computer program. The processor is configured to execute the program stored in the memory, so that the UE performs any method in the second aspect of this application. Specifically, the transmitter is configured to send RRC connected inactive state indication information of the UE to an access network device, where the RRC connected inactive state indication information is used to indicate whether it is suitable for the UE to enter an RRC connected inactive state, and an RRC state of the UE includes at least an RRC connected state, the RRC connected inactive state, and an RRC idle state the transmitter is configured to send RRC connected inactive state indication information of the UE to an access network device, where the RRC connected inactive state indication information is used to indicate whether it is suitable for the UE to enter an RRC connected inactive state, and an RRC state of the UE includes at least an RRC connected state, the RRC connected inactive state, and an RRC idle state.

The receiver is configured to: when the UE leaves the RRC connected state, receive a command that is of entering the RRC connected inactive state and that is sent by the access network device, where the command of entering the RRC connected inactive state is sent by the access network device based on the RRC connected inactive state indication information of the UE.

The processor is configured to control, according to the command of entering the RRC connected inactive state, the UE to enter the RRC connected inactive state.

The memory is configured to store context information of the UE.

Optionally, the RRC connected inactive state indication information of the UE includes at least one piece of the following information: RRC connected inactive state indication information of at least one of a bearer, a network slice, and a service flow that are set up by the UE, and RRC connected inactive state indication information of a device granularity of the UE, and the RRC connected inactive state indication information of the device granularity is used to indicate whether all bearers, network slices, and service flows of the UE are suitable for entering the RRC connected inactive state.

Further, after the UE enters the RRC connected inactive state, the processor is further configured to determine a paging occasion of the UE. The receiver is further configured to receive, on the determined paging occasion, a paging message sent by the access network device, where the paging message includes a UE paging identity, and the UE paging identity is an access-stratum identity of the UE. The processor is further configured to initiate, to the access network device based on the paging message, a process of entering the RRC connected state.

A ninth aspect of this application provides a core network device, and the core network device includes a processor, a transmitter, and a memory. The transmitter and the memory are connected to the processor by using a bus. The transmitter is configured to send data to other devices. The memory is configured to store a computer program. The processor is configured to execute the program stored in the memory, so that the core network device is configured to perform any method in the third aspect of this application. Specifically, the processor is configured to determine, based on information about UE, whether it is suitable for the UE to enter a radio resource control RRC connected inactive state, where an RRC state of the UE includes at least an RRC connected state, the RRC connected inactive state, and an RRC idle state.

The transmitter is configured to: when it is determined that it is suitable for the UE to enter the RRC connected inactive state, send RRC connected inactive state indication information of the UE to an access network device, where the RRC connected inactive state indication information is used to indicate whether it is suitable for the UE to enter the RRC connected inactive state.

Optionally, the information about the UE includes at least one piece of the following information: a type of the UE, subscription information of the UE, information about a bearer added for the UE, information about a network slice added for the UE, and information about a service flow added for the UE.

The RRC connected inactive state indication information of the UE includes at least one piece of the following information: RRC connected inactive state indication information of at least one of a bearer, a network slice, and a service flow that are set up by the UE, and RRC connected inactive state indication information of a device granularity of the UE, and the RRC connected inactive state indication information of the device granularity is used to indicate whether all bearers, network slices, and service flows of the UE are suitable for entering the RRC connected inactive state.

According to the method and apparatus for RRC state control that are provided in this application, the access network device obtains the RRC connected inactive state indication information of the UE. When the UE leaves the RRC connected state, the access network device determines, based on the RRC connected inactive state indication information, that the UE enters the RRC connected inactive state or the RRC idle state. When determining that the UE enters the RRC connected inactive state, the access network device stores the context information of the UE, and sends, to the UE, the command of entering the RRC connected inactive state, so that the UE enters the RRC connected inactive state. According to the method, the access network device can control, based on a state of the UE, the UE to enter an appropriate RRC state, thereby reducing signaling overheads and improving system performance.

DESCRIPTION OF EMBODIMENTS

Figure 1:
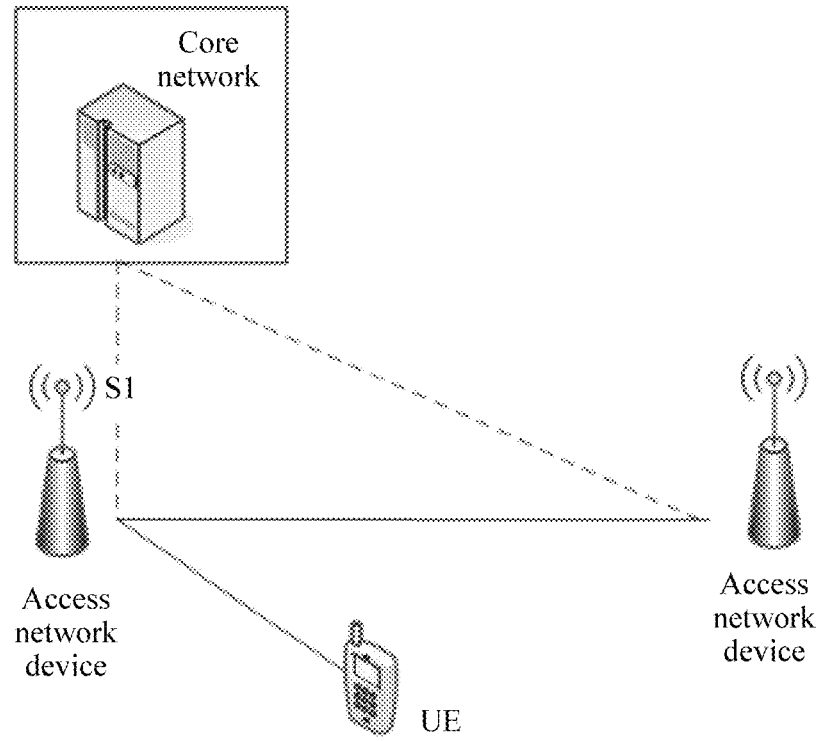
FIG. 1 is a diagram of a system architecture of a next-generation network.

The method in this application is applied to a next-generation network system. FIG. 1 is a diagram of a system architecture of a next-generation network. As shown in FIG. 1, the next-generation network includes a core network, an access network device, and UE. There may be one or more access network devices and UEs. The access network device in the next-generation network is mainly responsible for radio resource management of a radio interface, connection control, cell management, scheduling, quality of service (QoS), and the like. The access network device in the next-generation network may alternatively be referred to as a base station, an eNB, a new RAT, or the like. Unless otherwise specified, an access network device in the following embodiments is the access network device in the next-generation network. A new RRC state: RRC connected inactive state (Connected Inactive or Inactive Connected), is introduced for the UE in the next-generation network. Certainly, the UE still has an RRC connected state and an RRC idle state in an LTE system. A similarity between the RRC idle state and the RRC connected inactive state is that the UE cannot perform data transmission in either the RRC idle state or the RRC connected inactive state, and if the UE needs to transmit data, the UE needs to switch from the RRC idle state or the RRC connected inactive state to the RRC connected state. A difference between the RRC idle state and the RRC connected inactive state is that a time consumed by the UE to enter the RRC connected state from the RRC connected inactive state is less than a time consumed by the UE to enter the RRC connected state from the RRC idle state, and there is a smaller amount of interaction signaling used when the UE enters the RRC connected state from the RRC connected inactive state, so that the UE can quickly enter the RRC connected state from the RRC connected inactive state, thereby reducing signaling overheads.

Figure 2:
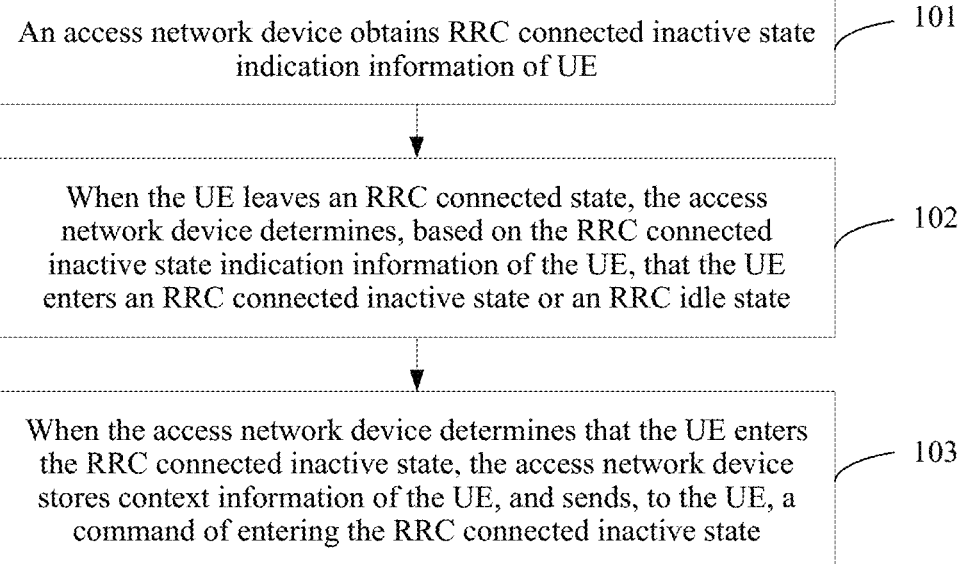
FIG. 2 is a flowchart of a method for RRC state control according to Embodiment 1.

FIG. 2 is a flowchart of a method for RRC state control according to Embodiment 1. As shown in FIC 2, the method in this embodiment may include the following steps.

Step 101. An access network device obtains RRC connected inactive state indication information of UE. The RRC connected inactive state indication information is used to indicate whether it is suitable for the UE to enter an RRC connected inactive state. In a next-generation network, an RRC state of the UE includes at least an RRC connected state, the RRC connected inactive state, and an RRC idle state. The RRC connected inactive state indication information of the UE may be sent to the access network device by a core network or the UE. The indication information may be represented by using a 1-bit indication value, and a value of the indication value is true or false. When the value of the indication value is true, it indicates that it is suitable for the UE to enter the RRC connected inactive state. When the value of the indication value is false, it indicates that it is unsuitable for the UE to enter the RRC connected inactive state. Optionally, the indication information may be 1-bit identifier information. A network side or the UE sends the identifier information to the access network device only when it is suitable for the UE to enter the RRC connected inactive state, and the network side or the UE does not send the identifier information to the access network device when it is unsuitable for the UE to enter the RRC connected inactive state. In this case, the access network device can determine that it is suitable for the UE to enter the RRC connected inactive state, provided that the access network device receives the identifier information.

The RRC connected inactive state indication information of the UE may include only RRC connected inactive state indication information of at least one of a bearer, a network slice (Network Slicing), and a service flow that are set up by the UE, or may include only RRC connected inactive state indication information of a device granularity of the UE, or may include RRC connected inactive state indication information of at least one of a beam, a network slice, and a service flow that are set up by the UE, and RRC connected inactive state indication information of a device granularity of the UE. The RRC connected inactive state indication information of the device granularity is used to indicate whether all bearers, network slices, and service flows of the UE are suitable for entering the RRC connected inactive state.

In this embodiment, the bearer set up by the UE is a bearer that may be currently used by the UE for data transmission, the network slice set up by the UE is a network slice that is allocated by the network side to the UE and that is used for data transmission, and the service flow set up by the UE is a service flow that is currently being transmitted by the UE. The bearer is a logical path from the core network to the UE, and includes an S1 bearer between a base station and the core network and a radio bearer between the base station and a terminal from the perspective of downward mapping. When mapped to a physical resource, the S1 bearer is a GPRS tunneling protocol (GTP) channel. The radio bearer includes a series of resources on RB resources at a packet data convergence protocol (PDCP) layer, a radio link control (RLC) layer, a medium access control (MAC) layer, and a physical layer. From the perspective of bearer content, the bearer is classified into a signaling radio bearer (SRB) and a data radio bearer (DRB). The SRB is used to carry RRC signaling and the DRB is used to carry user plane data. The network slice may mean that one physical network is divided into a plurality of virtual end-to-end networks, each virtual network (including a device, access, transmission, and a core network in the network) is logically independent, and when one virtual network is faulty, other virtual networks are not affected. The service flow is a data flow transmitted on the network slice or the bearer, for example, a data flow of a QQ service, a data flow of a browser, or a data flow of another application.

It should be noted that the UE may set up only a bearer, or only a network slice, or only a service flow. Then, the RRC connected inactive state indication information of the UE may include only RRC connected inactive state indication information of the bearer set up by the UE, or only RRC connected inactive state indication information of the network slice set up by the UE, or only RRC connected inactive state indication information of the service flow set up by the UE. The RRC connected inactive state indication information of the bearer is used to indicate whether the corresponding bearer is suitable for entering the RRC connected inactive state, the RRC connected inactive state indication information of the network slice is used to indicate whether the corresponding network slice is suitable for entering the RRC connected inactive state, and the RRC connected inactive state indication information of the service flow is used to indicate whether the corresponding service flow is suitable for entering the RRC connected inactive state. Certainly, the UE may set up only a bearer and a network slice, or only a bearer and a service flow, or only a network slice and a service flow, or set up a bearer, a network slice, and a service flow. There may be one or more bearers, network slices, or service flows that are set up by the UE.

It should be noted that the RRC connected inactive state indication information may be bearer-level, network slice-level, or service flow-level. The bearer is used as an example (cases of the network slice and the service flow are similar). For example, the UE sets up three bearers. The access network device learns that indication information of a bearer 1 indicates that it is suitable for the UE to enter the RRC connected inactive state (for example, the bearer 1 carries a web page browsing service of a user, and has a discontinuous transmission feature), indication information of a bearer 2 indicates that it is suitable for the UE to enter the RRC connected inactive state, and indication information of a bearer 3 indicates that it is unsuitable for the UE to enter the RRC connected inactive state.

Step 102. When the UE leaves an RRC connected state, the access network device determines, based on the RRC connected inactive state indication information of the UE, that the UE enters an RRC connected inactive state or an RRC idle state.

When the RRC connected inactive state indication information of the UE is the RRC connected inactive state indication information of the at least one of the bearer, the network slice, and the service flow that are set up by the UE, the access network device determines, based on the RRC connected inactive state indication information of the at least one of the bearer, the network slice, and the service flow that are set up by the UE, whether RRC connected inactive state indication information of at least one bearer, network slice, or service flow in the bearer, the network slice, and the service flow that are set up by the UE indicates that the corresponding bearer, network slice, or service flow is suitable for the RRC connected inactive state. When at least one bearer, network slice, or service flow in the bearer, the network slice, and the service flow that are set up by the UE is suitable for the RRC connected inactive state, the access network device determines that the UE enters the RRC connected inactive state. When none of the bearer, the network slice, and the service flow set up by the UE is suitable for the RRC connected inactive state, the access network device determines that the UE enters the RRC idle state.

When the RRC connected inactive state indication information of the UE is the RRC connected inactive state indication information of the device granularity of the UE, the access network device determines, based on the RRC connected inactive state indication information of the device granularity, whether the UE is suitable for the RRC connected inactive state. When the RRC connected inactive state indication information of the device granularity indicates that the UE is suitable for the RRC connected inactive state, the access network device determines that the UE enters the RRC connected inactive state. When the RRC connected inactive state indication information of the device granularity indicates that the UE is unsuitable for the RRC connected inactive state, the access network device determines that the UE enters the RRC idle state.

When the RRC connected inactive state indication information of the UE is the RRC connected inactive state indication information of the at least one of the bearer, the network slice, and the service flow that are set up by the UE, and the RRC connected inactive state indication information of the device granularity of the UE, a priority of the RRC connected inactive state indication information of the device granularity is higher than that of the RRC connected inactive state indication information of each of the bearer, the network slice, and the service flow. Therefore, the access network device first determines, based on the RRC connected inactive state indication information of the device granularity, whether the UE is suitable for the RRC connected inactive state. When the RRC connected inactive state indication information of the device granularity indicates that the UE is suitable for the RRC connected inactive state, the access network device determines that the UE enters the RRC connected inactive state, and no longer need to determine whether the RRC connected inactive state indication information of the bearer, the network slice, and the service flow indicates that it is suitable for the UE to enter the RRC connected inactive state. When the RRC connected inactive state indication information of the device granularity indicates that the UE is unsuitable for the RRC connected inactive state, the access network device determines, based on the RRC connected inactive state indication information of the at least one of the bearer, the network slice, and the service flow that are set up by the UE, whether RRC connected inactive state indication information of at least one bearer, network slice, or service flow in the bearer, the network slice, and the service flow that are set up by the UE indicates that the corresponding bearer, network slice, or service flow is suitable for the RRC connected inactive state. When at least one bearer, network slice, or service flow in the bearer or the network slice set up by the UE is suitable for the RRC connected inactive state, the access network device determines that the UE enters the RRC connected inactive state. When none of the bearer, the network slice, and the service flow set up by the UE is suitable for the RRC connected inactive state, the access network device determines that the UE enters the RRC idle state.

It should be noted that it is not necessarily determined, according to the foregoing rule each time the UE leaves the RRC connected state, whether the UE enters the RRC connected inactive state. For example, when the access network device determines that the UE does not perform data transmission within a period of time, and therefore determines that the UE leaves the RRC connected state, the access network device performs determining according to the foregoing rule. When the access network device identifies that the UE is abnormal, or the access network device receives a UE context release command sent by the core network, or an S1 interface of the UE is released, or for other reasons, and therefore the access network device determines that the UE leaves the RRC connected state, the access network device commands the UE to enter the RRC idle state. The access network device may determine, based on an inactivity timer (inactivity timer) in an LTE network or another counter that has a function similar to that of the inactivity timer and that is in the next-generation network or the LTE network, that the UE does not perform data transmission within the period of time. In the LTE network, when the access network device determines that the UE does not perform data transmission, the access network device starts the inactivity timer, and if the UE does not perform data transmission during timing of the inactivity timer, when the inactivity timer expires, the access network device determines that the UE enters the RRC idle state. Once it is detected that the UE performs data transmission during the timing of the inactivity timer, the access network device resets the inactivity timer.

Step 103. When the access network device determines that the UE enters the RRC connected inactive state, the access network device stores context information of the UE, and sends, to the UE, a command of entering the RRC connected inactive state.

The command of entering the RRC connected inactive state may be a new RRC message, for example, an RRC inactive command, used to command the UE to enter the RRC connected inactive state, or may be an RRC connection release message, where the RRC connection release message carries indication information, used to instruct the UE to enter the RRC connected inactive state. In this embodiment, after commanding the UE to enter the RRC connected inactive state, the access network device further stores the context information of the UE. After the UE receives the command that is of entering the RRC connected inactive state and that is sent by the access network device and enters the RRC connected inactive state, the UE also stores the context information of the UE. The access network device and the UE store the context information of the UE after the UE enters the RRC connected inactive state, so that the UE can quickly enter the RRC connected state from the RRC connected inactive state subsequently. The context information of the UE includes a configuration, security information, and the like of the UE.

It should be noted that in the method in this embodiment, when the access network device determines to enable the UE to enter the RRC connected inactive state, the access network device does not notify the core network that the UE enters the state. To be specific, the RRC connected inactive state of the UE is transparent to the core network, the core network does not know that the UE enters the RRC connected inactive state, and the core network side does not distinguish between the RRC connected state and the RRC connected inactive state of the UE, in other words, the core network side considers, by default, that the UE is still in the RRC connected state.

In this embodiment, the access network device obtains the RRC connected inactive state indication information of the UE. When the UE leaves the RRC connected state, the access network device determines, based on the RRC connected inactive state indication information, that the UE enters the RRC connected inactive state or the RRC idle state. When determining that the UE enters the RRC connected inactive state, the access network device stores the context information of the UE, and sends, to the UE, the command of entering the RRC connected inactive state, so that the UE enters the RRC connected inactive state. According to the method, the access network device can control, based on a state of the UE, the UE to enter an appropriate RRC state, thereby reducing signaling overheads and improving system performance.

Figure 3:
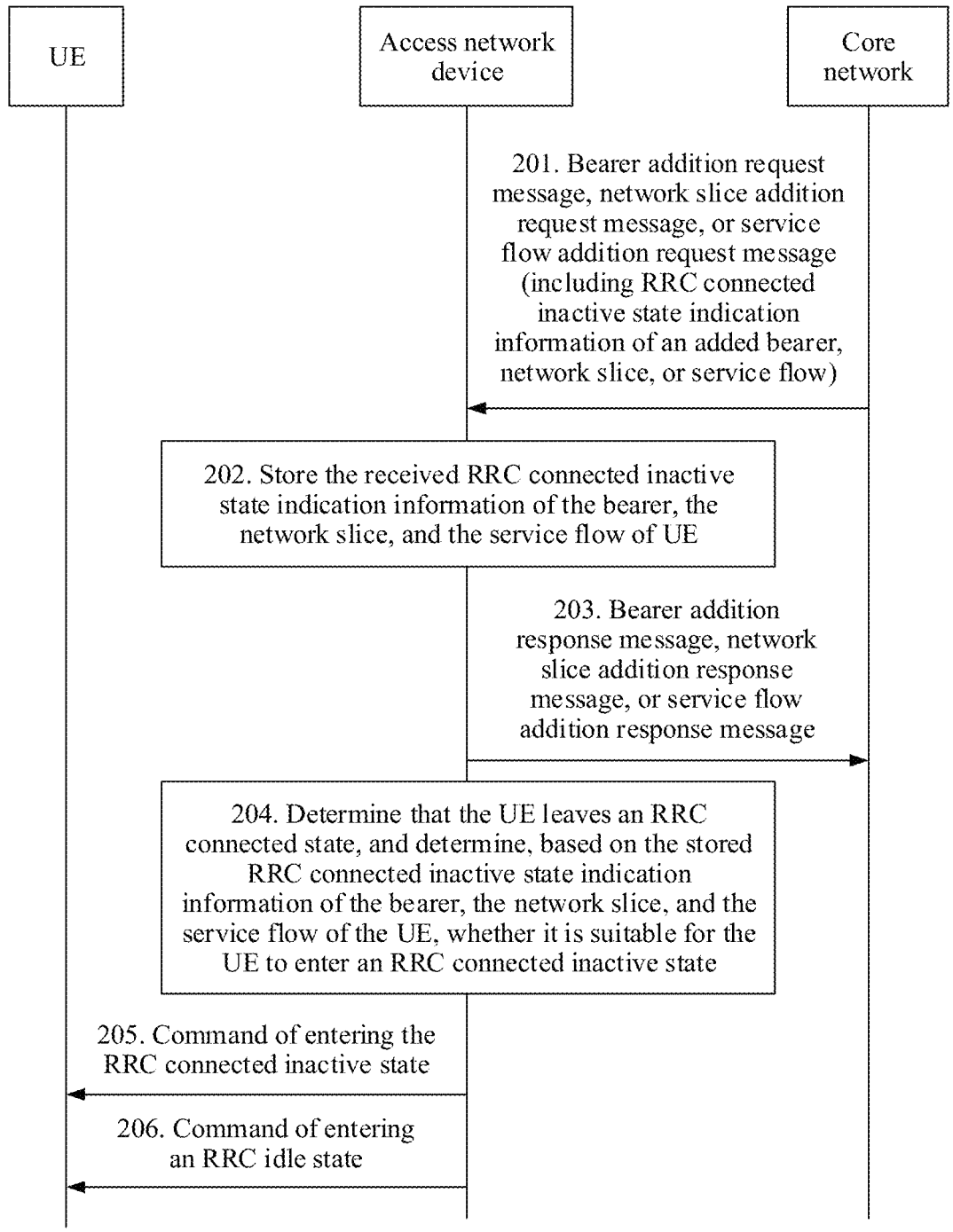
FIG. 3 is a flowchart of a method for RRC state control according to Embodiment 2.

Based on Embodiment 1, Embodiment 2 provides a method for RRC state control. In this embodiment, for example, RRC connected inactive state indication information of UE is RRC connected inactive state indication information of at least one of a bearer, a network slice, and a service flow that are set up by the UE, and an access network device obtains the RRC connected inactive state indication information of the at least one of the bearer, the network slice, and the service flow of the UE from a core network. FIG. 3 is a flowchart of the method for RRC state control according to Embodiment 2. As shown in FIG. 3, the method provided in this embodiment may include the following steps.

Step 201. The core network sends a bearer addition request message, a network slice addition request message, or a service flow addition request message to the access network device, where the bearer addition request message includes RRC connected inactive state indication information of an added bearer, the network slice addition request message includes RRC connected inactive state indication information of an added network slice, and the service flow addition request message includes RRC connected inactive state indication information of an added service flow.

In this embodiment, the core network determines, based on information about the bearer, the network slice, or the service flow added for the UE, whether the added bearer, network slice, or service flow is suitable for entering an RRC connected inactive state. For example, for a bearer through which data transmission is discontinuously performed, the core network determines that it is suitable for entering the RRC connected inactive state, or for a bearer through which no discontinuous data transmission is performed, the core network determines that it is unsuitable for entering the RRC connected inactive state. Alternatively, the core network determines, based on a QoS requirement of the bearer, the network slice, or the service flow, whether it is suitable for entering the RRC connected inactive state. For example, for a bearer, a network slice, or a service flow having a high QoS requirement, the core network determines that it is suitable for entering the RRC connected inactive state, and for a bearer, a network slice, or a service flow having a low QoS requirement, the core network determines that it is unsuitable for entering the RRC connected inactive state. Herein, the description is merely an example, and determining may be alternatively performed based on another feature of the bearer, the network slice, or the service flow.

Each time the core network adds one bearer, network slice, or service flow for the UE, the core network adds RRC connected inactive state indication information to a corresponding addition request message. The indication information may be represented, for example, by using true and false. For example, when the bearer is suitable for entering the RRC connected inactive state, a value corresponding to RRC connected inactive state indication information in a bearer addition request message is true, or when the bearer is unsuitable for entering the RRC connected inactive state, a value corresponding to RRC connected inactive state indication information in a bearer addition request message is false.

Step 202. The access network device stores the received RRC connected inactive state indication information of the bearer, the network slice, and the service flow of the UE.

After receiving the indication information sent by the core network, the access network device stores the indication information.

Step 203. The access network device sends a bearer addition response message, a network slice addition response message, or a service flow addition response message to the core network.

If the access network device receives the bearer addition request message sent by the core network, the access network device sends the bearer addition response message to the core network. If the access network device receives the network slice addition request message sent by the core network, the access network device sends the network slice addition response message to the core network. If the access network device receives the service flow addition request message sent by the core network, the access network device sends the service flow addition response message to the core network.

Step 204. The access network device determines that the UE leaves an RRC connected state, and determines, based on the stored RRC connected inactive state indication information of the bearer, the network slice, and the service flow of the UE, whether it is suitable for the UE to enter an RRC connected inactive state.

When the access network device determines that it is suitable for the UE to enter the RRC connected inactive state, step 205 is performed. When the access network device determines that it is unsuitable for the UE to enter the RRC connected inactive state, step 206 is performed.

For a process in which the access network device determines whether it is suitable for the UE to enter the RRC connected inactive state, refer to the descriptions of Embodiment 1.

Step 205. The access network device sends, to the UE, a command of entering the RRC connected inactive state.

Before sending the command of entering the RRC connected inactive state, the access network device further stores context information of the UE.

Step 206. The access network device sends, to the UE, a command of entering an RRC idle state.

In this embodiment, the access network device receives and stores RRC connected inactive state indication information that is sent by the core network and that is of at least one of the bearer, the network slice, and the service flow of the UE, and when the UE leaves the RRC connected state, the access network device determines, based on the RRC connected inactive state indication information of the at least one of the bearer, the network slice, and the service flow of the UE, whether the UE enters the RRC connected inactive state or the RRC idle state. According to the method, the UE can be controlled, based on a feature of a UE service, to enter an appropriate RRC state, thereby reducing signaling overheads and improving system performance.

Figure 4:
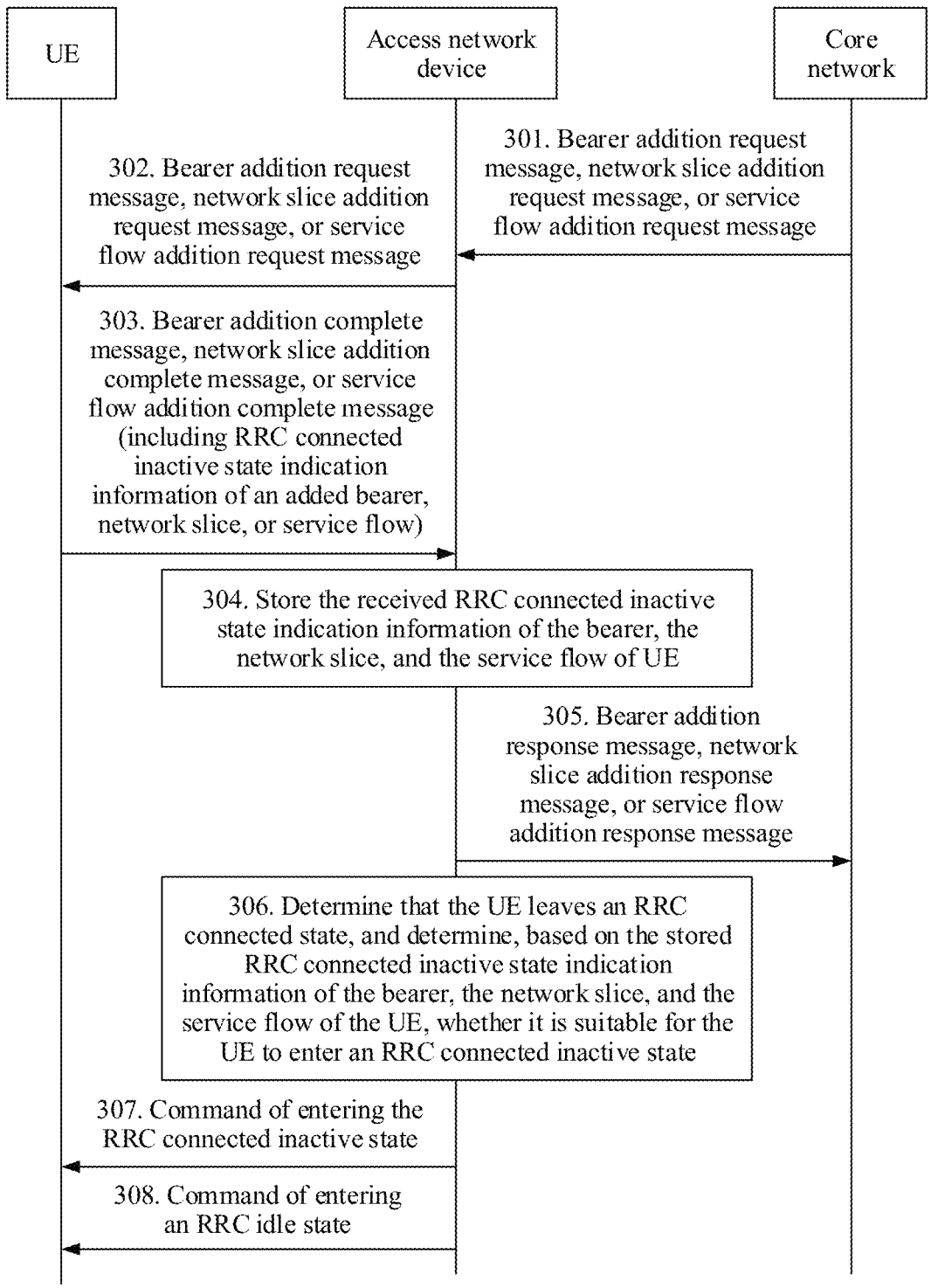
FIG. 4 is a flowchart of a method for RRC state control according to Embodiment 3.

Based on Embodiment 1, Embodiment 3 provides a method for RRC state control. A difference between this embodiment and Embodiment 2 is that in this embodiment, an access network device obtains RRC connected inactive state indication information of at least one of a bearer, a network slice, and a service flow of UE from the UE. FIG. 4 is a flowchart of the method for RRC state control according to Embodiment 3. As shown in FIG. 4, the method provided in this embodiment may include the following steps.

Step 301. A core network sends a bearer addition request message, a network slice addition request message, or a service flow addition request message to the access network device.

Step 302. The access network device sends the bearer addition request message, the network slice addition request message, or the service flow addition request message to the UE.

The bearer addition request message includes information about an added bearer, the network slice addition request message includes information about an added network slice, and the service flow addition request message includes information about an added service flow. In this embodiment, the UE determines, based on a feature of the bearer, the network slice, or the service flow, whether the corresponding bearer, network slice, or service flow is suitable for entering an RRC connected inactive state. Specifically, the UE determines, based on the information about the added bearer, whether the added bearer is suitable for entering the RRC connected inactive state, and similarly, determines, based on the information about the added network slice or service flow, whether the corresponding network slice or service flow is suitable for entering the RRC connected inactive state. In this embodiment, the UE may determine, by using a method the same as that of the core network in Embodiment 2, whether the bearer, the network slice, or the service flow is suitable for entering the RRC connected inactive state. Certainly, the UE may use a method different from that of the core network. This embodiment does not limit the method, and does not limit specific manners used by the UE and the core network. After determining whether the bearer, the network slice, or the service flow is suitable for entering the RRC connected inactive state, the UE sends RRC connected inactive state indication information of the bearer, the network slice, or the service flow to the access network device, and the UE may add the indication information to a bearer addition complete message, a network slice addition complete message, or a service flow addition complete message and send the addition complete message to the access network device.

Step 303. The UE sends a bearer addition complete message, a network slice addition complete message, or a service flow addition complete message to the access network device, where the bearer addition complete message includes RRC connected inactive state indication information of an added bearer, the network slice addition complete message includes RRC connected inactive state indication information of an added network slice, and the service setup complete message includes RRC connected inactive state indication information of an added service flow.

Step 304. The access network device stores the received RRC connected inactive state indication information of the bearer, the network slice, and the service flow of the UE.

Step 305. The access network device sends a bearer addition response message, a network slice addition response message, or a service flow addition response message to the core network.

Step 306. The access network device determines that the UE leaves an RRC connected state, and determines, based on the stored RRC connected inactive state indication information of the bearer, the network slice, and the service flow of the UE, whether it is suitable for the UE to enter an RRC connected inactive state.

When the access network device determines that it is suitable for the UE to enter the RRC connected inactive state, step 307 is performed. When the access network device determines that it is unsuitable for the UE to enter the RRC connected inactive state, step 308 is performed.

For a process in which the access network device determines whether it is suitable for the UE to enter the RRC connected inactive state, refer to the descriptions of Embodiment 1.

Step 307. The access network device sends, to the UE, a command of entering the RRC connected inactive state.

Before sending the command of entering the RRC connected inactive state, the access network device further stores context information of the UE.

Step 308. The access network device sends, to the UE, a command of entering an RRC idle state.

In this embodiment, the access network device receives and stores RRC connected inactive state indication information that is sent by the UE and that is of at least one of the bearer, the network slice, and the service flow of the UE, and when the UE leaves the RRC connected state, the access network device determines, based on the RRC connected inactive state indication information of the at least one of the bearer, the network slice, and the service flow of the UE, whether the UE enters the RRC connected inactive state or the RRC idle state. According to the method, the UE can be controlled, based on a feature of a UE service, to enter an appropriate RRC state, thereby reducing signaling overheads and improving system performance.

In the methods in Embodiment 2 and Embodiment 3, the core network and the UE determine, based on factors: features of the bearer, the network slice, or the service flow of the UE, whether it is suitable for the UE to enter the RRC connected inactive state. In another embodiment of this application, the core network and the UE may alternatively determine, based on factors such as user subscription information of the UE and a type of the UE (for example, whether the UE is a terminal at a fixed position), whether it is suitable for the UE to enter the RRC connected inactive. When the core network or the UE determines, based on the factors such as the user subscription information of the UE and the type of the UE, that it is suitable for the UE to enter the RRC connected inactive state, all bearers, network slices, or service flows of the UE are suitable for entering the RRC connected inactive state. Similarly, when the core network or the UE determines, based on the factors such as the user subscription information of the UE and the type of the UE, that it is unsuitable for the UE to enter the RRC connected inactive state, all bearers, network slices, or service flows of the UE are unsuitable for entering the RRC connected inactive state.

If the core network determines, based on the user subscription information, the type, and the like of the UE, whether it is suitable for the UE to enter the RRC connected inactive state, in an implementation, when adding each bearer, network slice, or service flow for the UE, the core network may add RRC connected inactive state indication information of the added bearer, network slice, or service flow to a bearer addition request message, a network slice addition request message, or a service flow addition request message and send the addition request message to the access network device.

In another implementation, the core network defines new RRC connected inactive state indication information of a device granularity. The RRC connected inactive state indication information of the device granularity is used to indicate whether all bearers, network slices, and service flows of the UE are suitable for entering the RRC connected inactive state. In this way, the core network needs to send only the RRC connected inactive state indication information of the device granularity of the UE to the access network device. The access network device receives the RRC connected inactive state indication information that is of the device granularity and that is sent by the core network, stores the RRC connected inactive state indication information of the device granularity, and subsequently, determines, based on the RRC connected inactive state indication information of the device granularity, whether it is suitable for the UE to enter the RRC connected inactive state. The core network may add the RRC connected inactive state indication information of the device granularity to an initial context setup request message and send the initial context setup request message to the access network device. The access network device receives the initial context setup request message sent by the core network, and obtains the RRC connected inactive state indication information of the device granularity from the initial context setup request message. Certainly, the core network may further send the RRC connected inactive state indication information of the device granularity to the access network device by using another RRC message.

If it is determined, based on the user subscription information, the type, and the like of the UE, whether it is suitable for the UE to enter the RRC connected inactive state, in an implementation, when the core network adds each bearer, network slice, or service flow for the UE, the UE may add RRC connected inactive state indication information of the added bearer, network slice, or service flow to a bearer addition complete message, a network slice addition complete message, or a service flow addition complete message and send the addition complete message to the access network device. In another implementation, the UE needs to send only RRC connected inactive state indication information of a device granularity of the UE to the access network device. The access network device receives the RRC connected inactive state indication information that is of the device granularity and that is sent by the UE, stores the RRC connected inactive state indication information of the device granularity, and subsequently, determines, based on the RRC connected inactive state indication information of the device granularity, whether it is suitable for the UE to enter the RRC connected inactive state. The UE may add the RRC connected inactive state indication information of the device granularity to an RRC connection setup complete message and send the RRC connection setup complete message to the access network device. The access network device receives the RRC connection setup complete message sent by the UE, and obtains the RRC connected inactive state indication information of the device granularity from the RRC connection setup complete message. Certainly, the UE may further send the RRC connected inactive state indication information of the device granularity to the access network device by using another RRC message.

Figure 5:
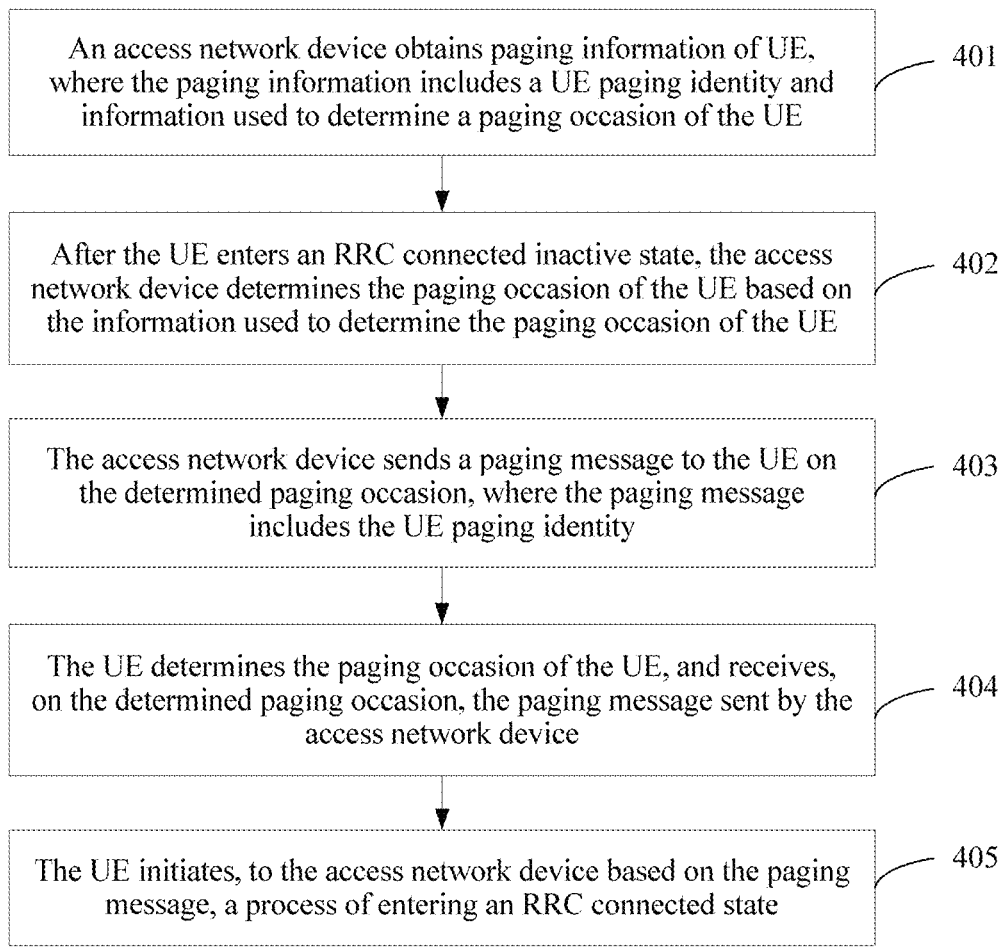
FIG. 5 is a flowchart of a method for RRC state control according to Embodiment 4.

Embodiment 4 provides a method for RRC state control. The method in this embodiment is used to control UE to enter an RRC connected state from an RRC connected inactive state. Because the RRC connected inactive state of the UE is transparent to a core network, in the method in this embodiment, after the UE enters the RRC connected inactive state, an access network device initiates a paging process, to trigger the UE to enter the RRC connected state from the RRC connected inactive state. FIG. 5 is a flowchart of the method for RRC state control according to Embodiment 4. As shown in FIG. 5, the method provided in this embodiment may include the following steps.

Step 401. The access network device obtains paging information of the UE, where the paging information includes a UE paging identity and information used to determine a paging occasion of the UE.

In this embodiment, the UE paging identity may be an international mobile subscriber identity (IMSI) of the UE, an S-temporary mobile subscriber identity (S-TMSI), or an access-stratum identity of the UE. The access-stratum identity of the UE is an identifier allocated by the access network device to the UE. The access-stratum identity of the UE may be any one of the following: a resumed identifier, a C-RNTI, a combination of the C-RNTI and an ECGI, and a combination of a PCI and the C-RNTI. The resumed identifier is an identifier generated by the access network device for the UE when the UE enters an RRC connected inactive state. The resumed identifier may be generated based on the C-RNTI, and the resumed identifier is used to identify the UE after the UE enters the RRC connected inactive state. After entering the RRC connected inactive state, the UE may move to another cell. Subsequently, when the UE needs to enter an RRC connected state, the access network device may identify the UE based on the resumed identifier.

The information used to determine the paging occasion of the UE may be a paging cycle and a UE identity index. The paging cycle may be a default paging cycle (broadcast in cell system information) in a cell on which the UE camps or a fixed value. The UE identity index may be obtained based on the access-stratum identity of the UE, or the information used to determine the paging occasion of the UE includes at least the access-stratum identity of the UE. The access network device determines the paging occasion of the UE based on the access-stratum identity of the UE.

The access network device may not know the IMSI or the S-IMSI of the UE. Then, the access network device may obtain the IMSI or the S-IMSI of the UE from the core network or the UE before or after the UE enters the RRC connected inactive state. The access network device knows the access-stratum identity of the UE, and may obtain the access-stratum identity locally.

Step 402. After the UE enters an RRC connected inactive state, the access network device determines the paging occasion of the UE based on the information used to determine the paging occasion of the UE.

The paging occasion of the UE includes a frame number and a subframe number of the paging occasion. The access network device may determine the frame number of the paging occasion by using a calculation formula the same as that used when the UE is in an RRC idle state. To be specific:

$$SFN \bmod T = (T \text{ div } N) \times (UE\_ID \bmod N).$$

The SFN is the frame number of the paging occasion, T is a length of the paging cycle of the UE (in other words, a quantity of frames included in one paging cycle), N is a quantity of paging frames (broadcast in the cell system information) in the paging cycle of the UE, and UE_ID is the UE identity index. A value of the UE identity index may be the UE paging identity mod 1024. As described in step 401, the UE paging identity may be the access-stratum identity of the UE.

The subframe number of the paging occasion may be determined by using a formula: $i\_s = \text{floor}(UE\_ID/N) \bmod Ns$. For specific meanings, refer to the 3GPP TS 36.304 protocol, and details are not described herein.

Certainly, the access network device may determine, by using a calculation formula different from that used when the UE is in the RRC idle state, the frame number and the subframe number of the paging occasion used when the UE is in the RRC connected inactive state. A principle of designing the calculation formula is to disperse different UEs among all paging resources of a cell as far as possible, and the specific calculation formula is not listed herein.

It should be noted that after the UE enters the RRC connected inactive state, the access network device may actively page the UE. For example, when receiving downlink data of the UE sent by the core network, the access network device determines, based on the downlink data of the UE, to send a paging message to the UE, so that the UE enters the RRC connected state from the RRC connected inactive state.

Step 403. The access network device sends a paging message to the UE on the determined paging occasion, where the paging message includes the UE paging identity.

Optionally, if the UE paging identity is the access-stratum identity of the UE, the paging message further includes a UE identity type. The UE identity type is an access-stratum identity type, and the access-stratum identity type is a new type defined in this embodiment. The UE identity type is optional. If the access network device pages the UE by using an existing paging message, the UE identity type needs to be carried, to indicate, to the UE, that the UE identity type carried in the paging message is the access-stratum identity type. If the access network device uses a newly defined paging message, the new paging message may not include the access-stratum identity type.

Step 404. The UE determines the paging occasion of the UE, and receives, on the determined paging occasion, the paging message sent by the access network device.

A manner in which the UE determines the paging occasion is the same as that of the access network device, so that the paging occasion determined by the access network device is consistent with the paging occasion determined by the UE. The access network device sends the paging message on the paging occasion, and the UE receives the paging message on the paging occasion. When determining the paging occasion, the UE may determine the paging occasion of the UE based on the access-stratum identity of the UE. Specifically, the UE first determines the UE identity index based on the access-stratum identity, and further determines the paging occasion based on the UE identity index.

Step 405. The UE initiates, to the access network device based on the paging message, a process of entering an RRC connected state.

Specifically, after receiving the paging message sent by the access network device, the UE initiates, based on a current RRC state of the UE, the process of entering the RRC connected state. In this embodiment, the current RRC state of the UE is the RRC connected inactive state. Then, the UE determines that the UE needs to enter the RRC connected state from the RRC connected inactive state. The UE sends a random access message to the access network device, the access network device returns a random access response to the UE, and after receiving the random access response, the UE sends an RRC connection resume request message to the access network device. After receiving the RRC connection resume request message sent by the UE, the access network device resumes an RRC connection for the UE, and sends an RRC connection resume message to the UE. The RRC connection resume request message may include the access-stratum identity of the UE, user authorization information, and an RRC connection setup reason. The access-stratum identity of the UE is used to identify UE for which an RRC connection is set up. After the UE receives the RRC connection resume message sent by the access network device, the UE and the access network device may communicate with each other by using stored context information of the UE.

The RRC connected inactive state is introduced, so that when the UE switches from the RRC connected inactive state to the RRC connected state, the UE needs to exchange only four pieces of signaling with the access network device, thereby greatly reducing signaling overheads when the UE enters the RRC connected state from the RRC idle state, and implementing quick resumption of the RRC connected state.

In this embodiment, the access network device obtains the paging information of the UE, and after the UE enters the RRC connected inactive state, determines the paging occasion of the UE based on the information used to determine the paging occasion of the UE, and the access network device sends the paging message on the determined paging occasion. The paging message includes the UE paging identity. The access network device actively pages the UE, to trigger the UE to enter the RRC connected state from the RRC connected inactive state, so that the RRC connected inactive state is transparent to the core network, signaling overheads are reduced, and coupling between the core network and the access network device is reduced.

In the method in Embodiment 4, the access network device performs active paging to trigger the UE to enter the RRC connected state. The method in which the access network device performs active paging and that is based on the access-stratum identity of the UE may be referred to as an access stratum-based paging mechanism, and the method in which the core network performs paging is referred to as a non-access stratum-based paging mechanism. The non-access stratum-based paging mechanism is an existing paging mechanism, and the access stratum-based paging mechanism is a new paging mechanism introduced in this application. In an implementation method, the two different paging mechanisms may be used at the same time. To be specific, the UE may use different paging mechanisms based on a current RRC state of the UE. When the UE is in the RRC idle state, the UE uses the conventional non-access stratum-based paging mechanism. When the UE is in the RRC connected inactive state, the UE uses the access stratum-based paging mechanism. To be specific, the UE calculates the paging occasion of the UE based on the access-stratum identity of the UE, and receives the paging message on the calculated paging occasion. The paging message carries the access-stratum identity of the UE.

Figure 6:
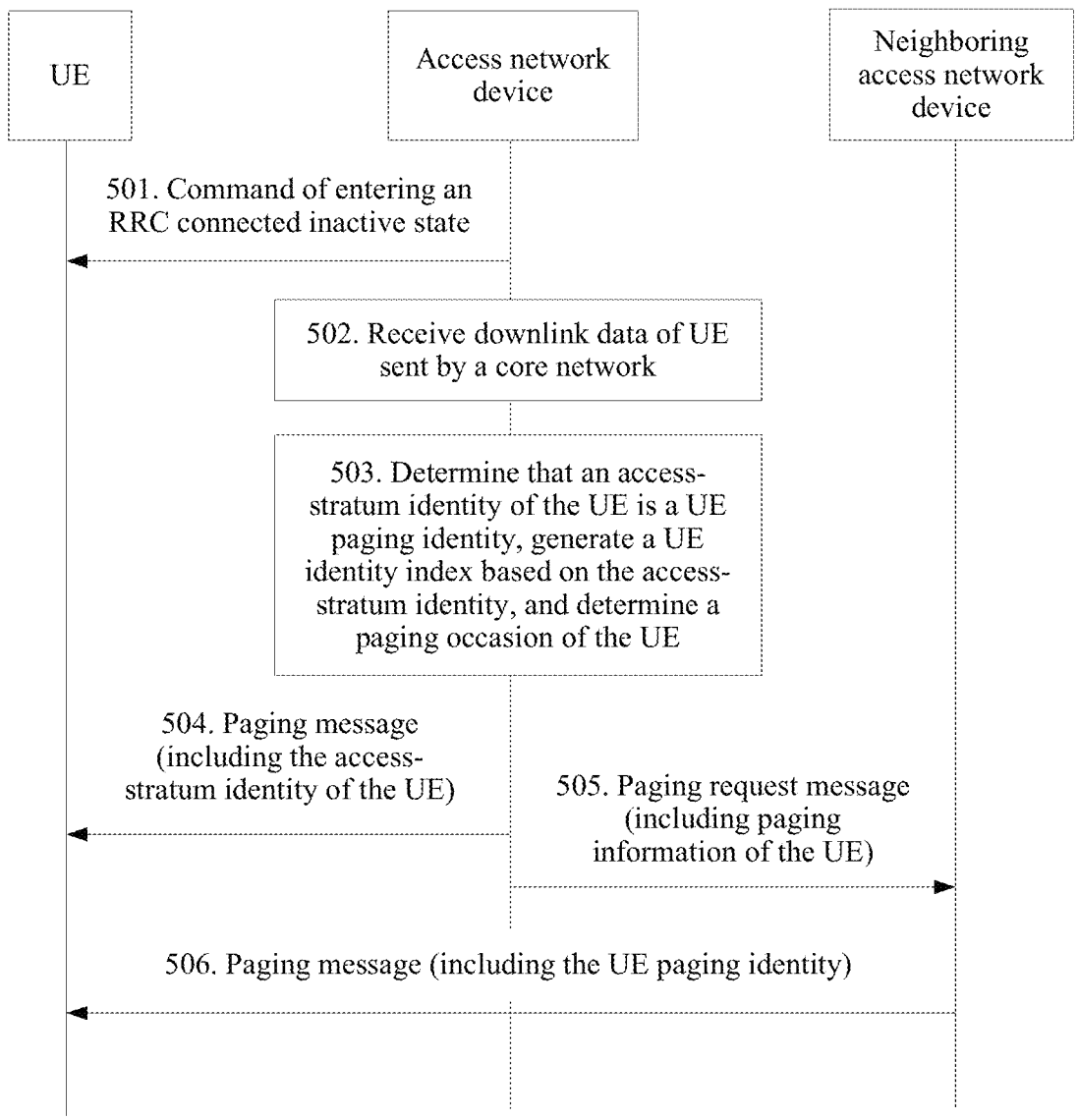
FIG. 6 is a flowchart of a method for RRC state control according to Embodiment 5.

Based on Embodiment 4, Embodiment 5 provides a method for RRC state control. This embodiment is described by using an example in which a UE paging identity is an access-stratum identity. FIG. 6 is a flowchart of the method for RRC state control according to Embodiment 5. As shown in FIG. 6, the method provided in this embodiment may include the following steps.

Step 501. An access network device sends, to UE, a command of entering an RRC connected inactive state.

Step 502. The access network device receives downlink data of the UE sent by a core network.

Step 503. The access network device determines that an access-stratum identity of the UE is a UE paging identity, generates a UE identity index based on the access-stratum identity, and determines a paging occasion of the UE.

For a specific generation manner, refer to the related descriptions of Embodiment 4, and for a paging occasion determining method, refer to the related descriptions of Embodiment 4.

Step 504. The access network device sends a paging message to the UE on the determined paging occasion, where the paging message includes the access-stratum identity of the UE.

Optionally, the paging message further includes a UE identity type, the UE identity type is an access-stratum identity type, and the access-stratum identity type is a new type defined in this application. The UE identity type is optional. If the access network device pages the UE by using an existing paging message, the UE identity type needs to be carried, to indicate, to the UE, that the UE identity type carried in the paging message is the access-stratum identity type. If the access network device uses a newly defined paging message, the new paging message may not include the access-stratum identity type, and is the access-stratum identity by default.

Step 505. The access network device sends a paging request message to a neighboring access network device, where the paging request message includes paging information of the UE.

Due to movement of the UE, the UE in the RRC connected inactive state may change a cell to be camped on, and a network side does not know the UE in the RRC connected inactive state camps on which cell of which access network device. Therefore, the network side may send the paging message in a plurality of cells of a plurality of access network devices. If the access network device sends the paging message in a cell, the access network device determines the paging occasion by using a default paging cycle of the cell. If the UE camps on a cell, the UE determines the paging occasion by using a default paging cycle of the cell. In addition, the paging occasion is also determined based on the access-stratum identity of the UE. In this embodiment, the access network device triggers paging. To support mobility of the UE in the RRC connected inactive state, the access network device sends the paging request message to the neighboring access network device. The paging request message is used to request the neighboring access network device to page the UE. There may be one or more neighboring access network devices of the access network device.

Because the neighboring access network device cannot obtain the paging information of the UE, in this embodiment, the access network device adds the paging information of the UE to the paging request message and sends the paging request message to the neighboring access network device. The paging information includes the access-stratum identity of the UE.

Step 506. The neighboring access network device sends the paging message to the UE, where the paging message includes the UE paging identity.

The neighboring access network device determines the paging occasion of the UE based on the paging information and pages the UE. The UE paging identity included in the paging message is the access-stratum identity of the UE.

Figure 7:
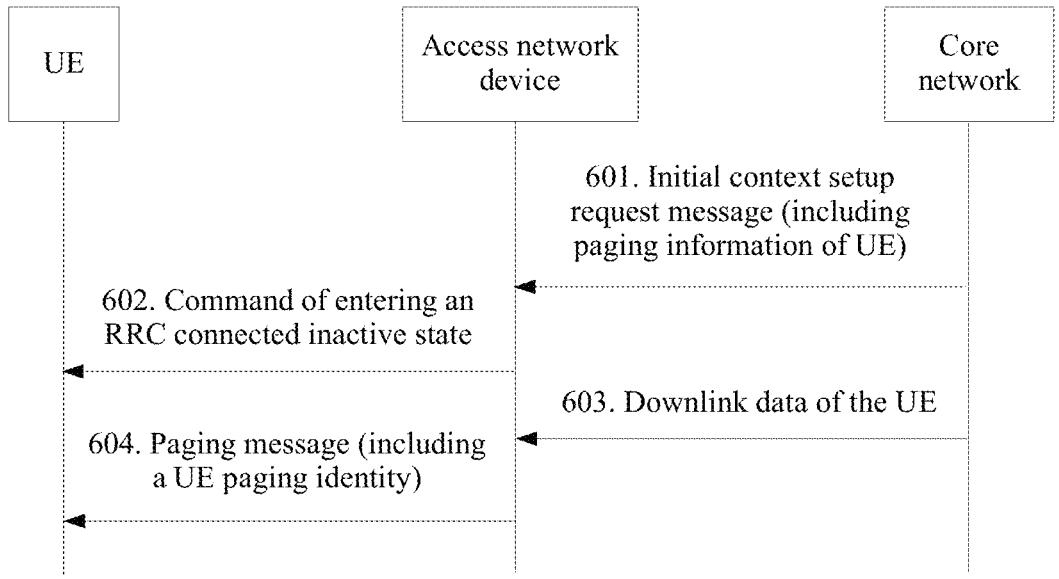
FIG. 7 is a flowchart of a method for RRC state control according to Embodiment 6.

Based on Embodiment 4, Embodiment 6 provides a method for RRC state control. A difference between this embodiment and Embodiment 5 is that in this embodiment, an access network device obtains paging information of UE from a core network, and a UE paging identity is an IMSI or an S-TMSI of the UE. The access network device may request the paging information of the UE from the core network. Alternatively, the core network actively sends the paging information of the UE to the access network device. FIG. 7 is a flowchart of the method for RRC state control according to Embodiment 6. As shown in FIG. 7, the method provided in this embodiment may include the following steps.

Step 601. The core network sends an initial context setup request message to the UE, where the initial context setup request message includes paging information of the UE.

The paging information includes a UE paging identity and information used to determine a paging occasion, and the UE paging identity is an IMSI or an S-TMSI of the UE.

Step 602. The access network device sends, to the UE, a command of entering an RRC connected inactive state.

Step 603. The core network sends downlink data of the UE to the access network device.

Step 604. The access network device sends a paging message to the UE based on the paging information, where the paging message includes a UE paging identity.

In Embodiment 6, the core network adds the paging information of the UE to the initial context setup request message. Certainly, the core network may alternatively add the paging information of the UE to another message. Alternatively, the access network device sends a paging information request message to the core network, where the paging information request message is used to request the paging information of the UE, and the core network returns a paging information response message to the UE, where the paging information response message includes the paging information of the UE.

In another embodiment of this application, the access network device may alternatively obtain the paging information from the UE. The access network device may request the paging information of the UE from the UE, or may receive the paging information of the UE that is actively sent by the UE. For example, before the UE enters the RRC connected inactive state, the access network device sends a paging information request message to the UE, and the UE returns a paging information response message to the access network device, where the paging information response message includes the paging information of the UE. Alternatively, the UE adds the paging information to an RRC connection setup complete message and sends the RRC connection setup complete message to the access network device.

It should be emphasized that the methods in Embodiment 4 to Embodiment 6 may be attached to the methods in Embodiment 1 to Embodiment 3. To be specific, the UE enters the RRC connected inactive state by using the methods in Embodiment 1 to Embodiment 3, and then enters the RRC connected state from the RRC connected inactive state by using the paging methods in Embodiment 4 to Embodiment 6. Certainly, the methods in Embodiment 4 to Embodiment 6 may alternatively not be attached to the methods in Embodiment 1 to Embodiment 3, and the paging methods in Embodiment 4 to Embodiment 6 are used independently.

Figure 8:
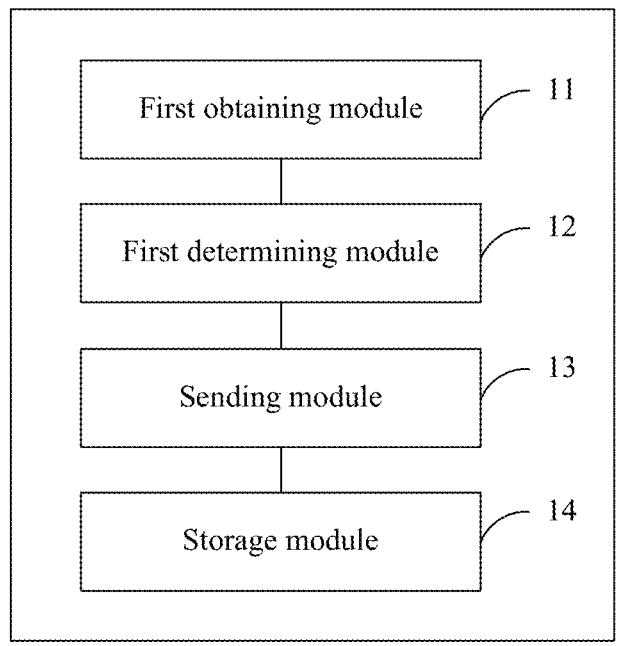
FIG. 8 is a schematic structural diagram of an access network device according to Embodiment 7.

FIG. 8 is a schematic structural diagram of an access network device according to Embodiment 7. As shown in FIG. 8, the access network device provided in this embodiment includes a first obtaining module 11, a first determining module 12, a sending module 13, and a storage module 14.

The first obtaining module 11 is configured to obtain RRC connected inactive state indication information of UE, where the RRC connected inactive state indication information is used to indicate whether it is suitable for the UE to enter an RRC connected inactive state, and an RRC state of the UE includes at least an RRC connected state, the RRC connected inactive state, and an RRC idle state.

The first determining module 12 is configured to: when the UE leaves the RRC connected state, determine, based on the RRC connected inactive state indication information, that the UE enters the RRC connected inactive state or the RRC idle state. The sending module 13 is configured to:

when the first determining module 12 determines that the UE enters the RRC connected inactive state, send, to the UE, a command of entering the RRC connected inactive state. The storage module 14 is configured to: after the sending module 13 sends the command of entering the RRC connected inactive state, store context information of the UE.

Optionally, the first obtaining module 11 is specifically configured to obtain RRC connected inactive state indication information of at least one of a bearer, a network slice, and a service flow that are set up by the UE. Correspondingly, the first determining module 12 is specifically configured to determine, based on the RRC connected inactive state indication information of the at least one of the bearer, the network slice, and the service flow that are set up by the UE, whether RRC connected inactive state indication information of at least one bearer, network slice, or service flow in the bearer, the network slice, and the service flow that are set up by the UE indicates that the corresponding bearer, network slice, or service flow is suitable for the RRC connected inactive state; and when at least one bearer, network slice, or service flow in the bearer, the network slice, and the service flow that are set up by the UE is suitable for the RRC connected inactive state, determine that the UE enters the RRC connected inactive state; or when none of the bearer, the network slice, and the service flow that are set up by the UE is suitable for the RRC connected inactive state, determine that the UE enters the RRC idle state.

Optionally, the first obtaining module 11 is specifically configured to: obtain RRC connected inactive state indication information of at least one of a bearer, a network slice, and a service flow that are set up by the UE, and obtain RRC connected inactive state indication information of a device granularity of the UE, where the RRC connected inactive state indication information of the device granularity is used to indicate whether all bearers, network slices, and service flows of the UE are suitable for entering the RRC connected inactive state. Correspondingly, the first determining module 12 is specifically configured to: when the RRC connected inactive state indication information of the device granularity indicates that the UE is suitable for the RRC connected inactive state, determine that the UE enters the RRC connected inactive state; or when the RRC connected inactive state indication information of the device granularity indicates that the UE is unsuitable for the RRC connected inactive state, determine whether RRC connected inactive state indication information of at least one bearer, network slice, or service flow in the bearer, the network slice, and the service flow that are set up by the UE indicates that the corresponding bearer, network slice, or service flow is suitable for the RRC connected inactive state; and when at least one bearer, network slice, or service flow in the bearer or the network slice set up by the UE is suitable for the RRC connected inactive state, determine that the UE enters the RRC connected inactive state; or when none of the bearer, the network slice, and the service flow that are set up by the UE is suitable for the RRC connected inactive state, determine that the UE enters the RRC idle state.

Optionally, the first obtaining module 11 is specifically configured to obtain RRC connected inactive state indication information of a device granularity of the UE. Correspondingly, the first determining module 12 is specifically configured to: when the RRC connected inactive state indication information of the device granularity indicates that the UE is suitable for the RRC connected inactive state, determine, by the access network device, that the UE enters the RRC connected inactive state; or when the RRC connected inactive state indication information of the device granularity indicates that the UE is unsuitable for the RRC connected inactive state, determine, by the access network device, that the UE enters the RRC idle state.

Optionally, the first obtaining module 11 receives the RRC connected inactive state indication information that is sent by a core network and that is of the at least one of the bearer, the network slice, and the service flow of the UE, and stores the received RRC connected inactive state indication information of the bearer, the network slice, and the service flow of the UE. Specifically, the rust obtaining module 11 receives at least one of a bearer addition request message, a network slice addition request message, and a service flow addition request message that are sent by the core network, where the bearer addition request message includes RRC connected inactive state indication information of an added bearer, the network slice addition request message includes RRC connected inactive state indication information of an added network slice, and the service flow addition request message includes RRC connected inactive state indication information of an added service flow.

Optionally, the first obtaining module 11 receives the RRC connected inactive state indication information that is sent by the UE and that is of the at least one of the bearer, the network slice, and the service flow of the UE, and stores the received RRC connected inactive state indication information of the bearer, the network slice, and the service flow of the UE. Specifically, the first obtaining module 11 receives at least one of a bearer addition complete message, a network slice addition complete message, or a service setup complete message sent by the UE, where the bearer addition complete message includes RRC connected inactive state indication information of an added bearer, the network slice addition complete message includes RRC connected inactive state indication information of an added network slice, and the service setup complete message includes RRC connected inactive state indication information of an added service flow.

Optionally, the first obtaining module 11 receives the RRC connected inactive state indication information that is of the device granularity and that is sent by a core network or the UE, and stores the RRC connected inactive state indication information of the device granularity. Specifically, the first obtaining module 11 receives an initial context setup request message sent by the core network, where the initial context setup request message includes the RRC connected inactive state indication information of the device granularity. Alternatively, the first obtaining module 11 receives an RRC connection setup complete message sent by the UE, where the RRC connection setup complete message includes the RRC connected inactive state indication information of the device granularity.

Optionally, the access network device further includes a fourth determining module. The fourth determining module is configured to determine a reason for which the UE leaves the RRC connected state. When the reason for which the UE leaves the RRC connected state is that the UE does not perform data transmission within a period of time, the first determining module 12 determines, based on the RRC connected inactive state indication information, that the UE enters the RRC connected inactive state or the RRC idle state; or when the reason for which the UE leaves the RRC connected state is any one of the following reasons: the access network device receives a UE context release command sent by a core network, an S1 interface connection of the UE is released, and the access network device identifies abnormality, the first determining module 12 is further configured to determine that the UE enters the RRC idle state.

The access network device provided in this embodiment may be configured to perform the methods in Embodiment 1 to Embodiment 3. Specific implementations and technical effects are similar, and details are not described herein again.

Figure 9:
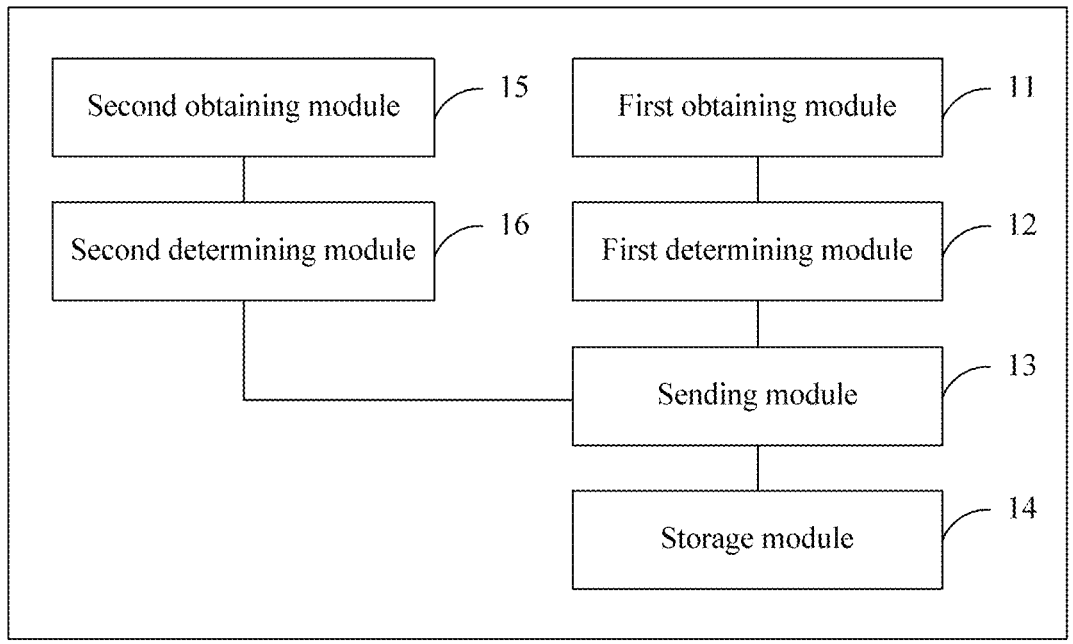
FIG. 9 is a schematic structural diagram of an access network device according to Embodiment 8.

FIG. 9 is a schematic structural diagram of an access network device according to Embodiment 8. As shown in FIG. 9, the access network device provided in this embodiment includes a second obtaining module 15, a second determining module 16, and a sending module 13.

The second obtaining module 15 is configured to obtain paging information of UE, where the paging information includes a UE paging identity and information used to determine a paging occasion of the UE. The second determining module 16 is further configured to: after the UE enters an RRC connected inactive state, determine the paging occasion of the UE based on the information used to determine the paging occasion of the UE. The sending module 13 is configured to send a paging message to the UE on the determined paging occasion, where the paging message includes the UE paging identity.

Optionally, the UE paging identity is an access-stratum identity of the UE, and the access-stratum identity of the UE includes a resumed identifier, a C-RNTI, a combination of an ECGI and the C-RNTI, or a combination of a PCI and the C-RNTI.

Optionally, after sending the paging message to the UE, the sending module 13 is further configured to send a paging request message to a neighboring access network device, where the paging request message is used to request the neighboring access network device to page the UE, and the paging request message includes the paging information of the UE.

Optionally, the paging message includes a UE identity type, and the UE identity type is used to identify that the UE paging identity is the access-stratum identity.

Optionally, the second obtaining module 15 is specifically configured to: request the paging information of the UE from a core network or the UE, or receive the paging information of the UE sent by a core network or the UE.

Optionally, the access network device further includes a receiving module and a third determining module. The receiving module is configured to: after the UE enters the RRC connected inactive state, receive downlink data of the UE sent by a core network. The third determining module is configured to determine, based on the downlink data of the UE, to send the paging message to the UE, so that the UE enters an RRC connected state from the RRC connected inactive state.

The access network device provided in this embodiment may be configured to perform the methods in Embodiment 4 to Embodiment 6. Specific implementations and technical effects are similar, and details are not described herein again.

Figure 10:
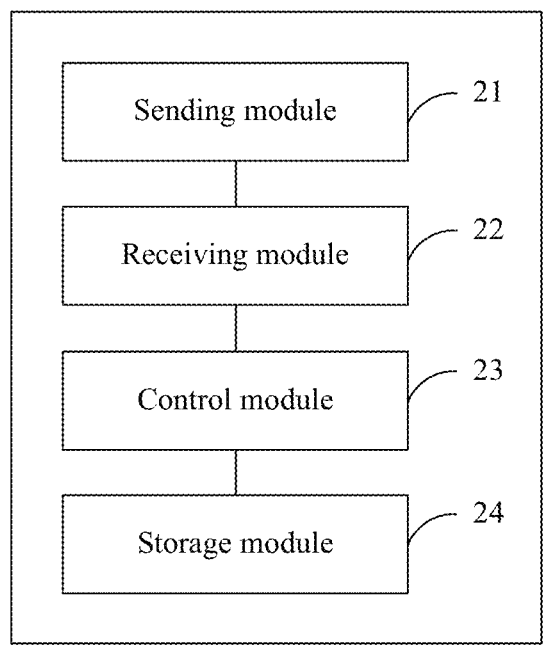
FIG. 10 is a schematic structural diagram of UE according to Embodiment 9.

FIG. 10 is a schematic structural diagram of UE according to Embodiment 9. As shown in FIG. 10, the UE provided in this embodiment includes a sending module 21, a receiving module 22, a control module 23, and a storage module 24.

The sending module 21 is configured to send RRC connected inactive state indication information of the UE to an access network device, where the RRC connected inactive state indication information is used to indicate whether it is suitable for the UE to enter an RRC connected inactive state, and an RRC state of the UE includes at least an RRC connected state, the RRC connected inactive state, and an RRC idle state.

The receiving module 22 is configured to: when the UE leaves the RRC connected state, receive a command that is of entering the RRC connected inactive state and that is sent by the access network device, where the command of entering the RRC connected inactive state is sent by the access network device based on the RRC connected inactive state indication information of the UE. The control module 23 is configured to control, according to the command of entering the RRC connected inactive state, the UE to enter the RRC connected inactive state. The storage module 24 is configured to: after the UE enters the RRC connected inactive state, store context information of the UE.

In this embodiment, the RRC connected inactive state indication information of the UE includes at least one piece of the following information: RRC connected inactive state indication information of at least one of a bearer, a network slice, and a service flow that are set up by the UE, and RRC connected inactive state indication information of a device granularity of the UE, and the RRC connected inactive state indication information of the device granularity is used to indicate whether all bearers, network slices, and service flows of the UE are suitable for entering the RRC connected inactive state.

Optionally, the UE further includes a determining module. The determining module is configured to determine a paging occasion of the UE. The receiving module 22 is further configured to receive, on the paging occasion determined by the determining module, a paging message sent by the access network device, where the paging message includes a UE paging identity, and the UE paging identity is an access-stratum identity of the UE. The control module 23 is further configured to initiate, to the access network device based on the paging message, a process of entering the RRC connected state. Specifically, the determining module determines the paging occasion of the UE based on the access-stratum identity of the UE.

The UE provided in this embodiment may be configured to perform the methods in Embodiment 1 to Embodiment 6. Specific implementations and technical effects are similar, and details are not described herein again.

Figure 11:
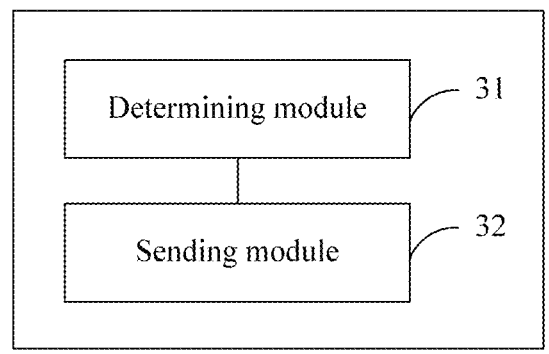
FIG. 11 is a schematic structural diagram of a core network device according to Embodiment 10.

FIG. 11 is a schematic structural diagram of a core network device according to Embodiment 10. As shown in FIG. 11, the core network device provided in this embodiment includes a determining module 31 and a sending module 32.

The determining module 31 is configured to determine, based on information about UE, whether it is suitable for the UE to enter an RRC connected inactive state, where an RRC state of the UE includes at least an RRC connected state, the RRC connected inactive state, and an RRC idle state.

The sending module 32 is configured to: when the determining module 31 determines that it is suitable for the UE to enter the RRC connected inactive state, send RRC connected inactive state indication information of the UE to an access network device, where the RRC connected inactive state indication information is used to indicate whether it is suitable for the UE to enter the RRC connected inactive state.

The information about the UE includes at least one piece of the following information: a type of the UE, subscription information of the UE, information about a bearer added for the UE, information about a network slice added for the UE, and information about a service flow added for the UE. The RRC connected inactive state indication information of the UE includes at least one piece of the following information: RRC connected inactive state indication information of at least one of a bearer, a network slice, and a service flow that are set up by the UE, and RRC connected inactive state indication information of a device granularity of the UE, and the RRC connected inactive state indication information of the device granularity is used to indicate whether all bearers, network slices, and service flows of the UE are suitable for entering the RRC connected inactive state.

Figure 12:
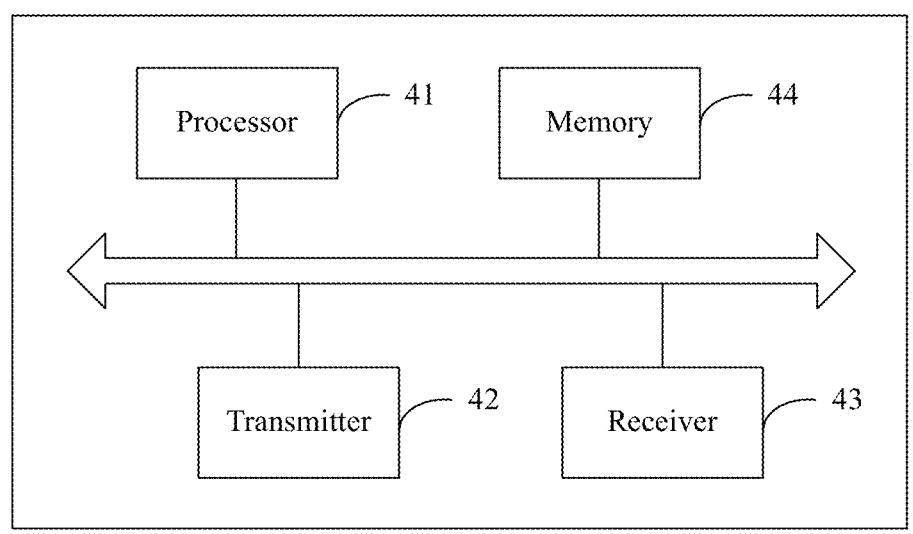
FIG. 12 is a schematic structural diagram of an access network device according to Embodiment 11.

FIG. 12 is a schematic structural diagram of an access network device according to Embodiment 11. As shown in FIG. 12, the access network device provided in this embodiment includes a processor 41, a transmitter 42, a receiver 43, and a memory 44. The transmitter 42, the receiver 43, and the memory 44 are connected to the processor 41 by using a bus. The transmitter 42 is configured to send data to other devices. The receiver 43 is configured to receive data sent by other devices. The memory 44 is configured to store a computer program. The processor 41 is configured to execute the program stored in the memory 44, so that the access network device is configured to perform any method in the method embodiments.

Figure 13:
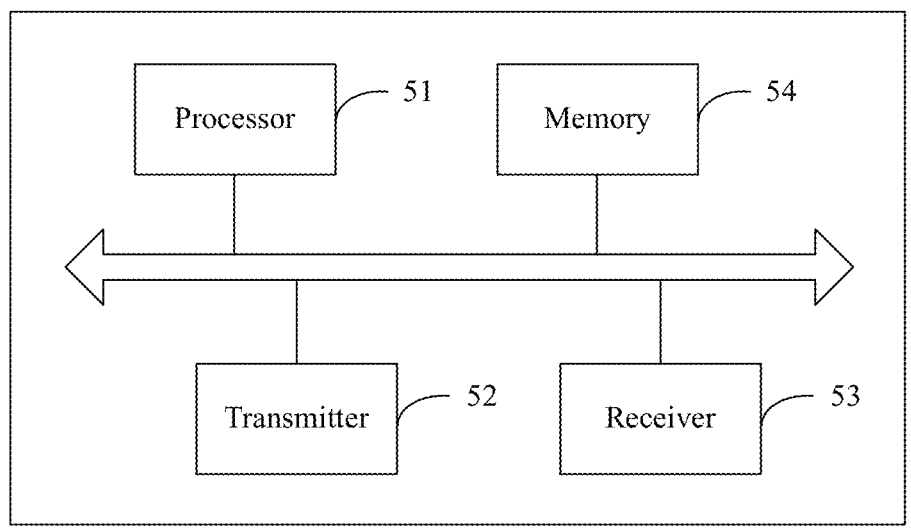
FIG. 13 is a schematic structural diagram of UE according to Embodiment 12.

FIG. 13 is a schematic structural diagram of UE according to Embodiment 12. As shown in FIG. 13, the UE provided in this embodiment includes a processor 51, a transmitter 52, a receiver 53, and a memory 54. The transmitter 52, the receiver 53, and the memory 54 are connected to the processor 51 by using a bus. The transmitter 52 is configured to send information to other devices. The receiver 53 is configured to receive information sent by other devices. The memory 54 is configured to store a computer program. The processor 51 is configured to execute the program stored in the memory 54. The UE in this embodiment may be configured to perform any method in the method embodiments.

Figure 14:
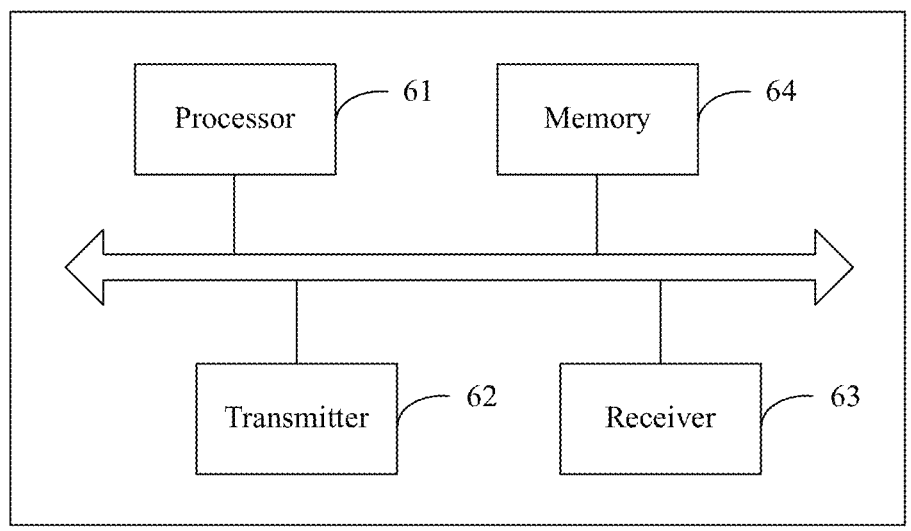
FIG. 14 is a schematic structural diagram of a core network device according to Embodiment 13.

FIG. 14 is a schematic structural diagram of a core network device according to Embodiment 13. As shown in FIG. 14, the core network device provided in this embodiment includes a processor 61, a transmitter 62, a receiver 63, and a memory 64. The transmitter 62, the receiver 63, and the memory 64 are connected to the processor 61 by using a bus. The transmitter 62 is configured to send information to other devices. The receiver 63 is configured to receive information sent by other devices. The memory 64 is configured to store a computer program. The processor 61 is configured to execute the program stored in the memory 64, so that the core network device may be configured to perform any method in the method embodiments.

What is claimed is:

1. A method for controlling a radio resource control (RRC) state of a mobile device, comprising:
    obtaining, by an access network device from a core network device, state indication information of the mobile device, wherein the state indication information is used by the access network device to determine whether the mobile device is suitable to enter an RRC inactive state, and the RRC inactive state is different from an RRC connected state or an RRC idle state; and
    determining, by the access network device based on the state indication information, whether the mobile device is suitable to enter the RRC inactive state;
    wherein
    when the state indication information indicates that the mobile device is suitable to enter the RRC connected inactive state, the mobile device is determined to be suitable to enter the RRC connected inactive state;
    when the state indication information indicates that the mobile device is not suitable to enter the RRC connected inactive state, the mobile device is determined to be suitable to enter the RRC idle state.

2. The method according to claim 1, further comprising:
    storing, by the access network device, the state indication information of the mobile device; and
    based on a determination that the mobile device is suitable to enter the RRC inactive state, sending, by the access network device, a command of entering the RRC inactive state to the mobile device.

3. The method according to claim 1, wherein the state indication information of the mobile device indicates whether all bearers, all network slices, or all service flows of the mobile device are suitable to enter the RRC inactive state.

4. The method according to claim 1, wherein the state indication information of the mobile device comprises an indicator, the indicator indicates whether the mobile device is or is not suitable to enter the RRC inactive state.

5. A method for controlling a radio resource control (RRC) state of a mobile device, comprising:
    determining, by a core network device based on information about the mobile device, whether the mobile device is suitable to enter an RRC inactive state; and
    sending, by the core network device, state indication information of the mobile device to an access network device;
    wherein the state indication information of the mobile device indicates to the access network device whether the mobile device is suitable to enter the RRC inactive state, and the RRC inactive state is different from an RRC connected state or an RRC idle state;
    wherein
    when the state indication information indicates that the mobile device is suitable to enter the RRC connected inactive state, the access network device determines that the mobile device is suitable to enter the RRC connected inactive state;
    when the state indication information indicates that the mobile device is not suitable to enter the RRC connected inactive state, the access network device determines that the mobile device is suitable to enter the RRC idle state.

6. The method according to claim 5, wherein the state indication information of the mobile device indicates whether all bearers, all network slices, or all service flows of the mobile device are suitable to enter the RRC inactive state.

7. An apparatus for controlling a radio resource control (RRC) state of a mobile device, applied in an access network device, comprising:
    at least one processor, and a memory storing instructions for execution by the at least one processor;
    wherein, when executed, the instructions cause the apparatus to:
    obtain state indication information of the mobile device from a core network device, wherein the state indication information is used by the apparatus to determine whether the mobile device is suitable to enter an RRC inactive state, and the RRC inactive state is different from an RRC connected state or an RRC idle state; and
    determine, based on the state indication information, whether the mobile device is suitable to enter the RRC inactive state;
    wherein
    when the state indication information indicates that the mobile device is suitable to enter the RRC connected inactive state, the mobile device is determined to be suitable to enter the RRC connected inactive state;

when the state indication information indicates that the mobile device is not suitable to enter the RRC connected inactive state, the mobile device is determined to be suitable to enter the RRC idle state.

8. The apparatus according to claim 7, wherein the instructions further cause the apparatus to:
store the state indication information of the mobile device; and
based on a determination that the mobile device is suitable to enter the RRC inactive state, send a command of entering the RRC inactive state to the mobile device.

9. The apparatus according to claim 7, wherein the state indication information of the mobile device indicates whether all bearers, all network slices, or all service flows of the mobile device are suitable to enter the RRC inactive state.

10. The apparatus according to claim 7, wherein the state indication information of the mobile device comprises an indicator, the indicator indicates whether the mobile device is or is not suitable to enter the RRC inactive state.

11. An apparatus for controlling a radio resource control (RRC) state of a mobile device, applied in a core network device, comprising:
at least one processor, and a memory storing instructions executable by the at least one processor;
wherein, when executed, the instructions cause the apparatus to:
determine, based on information about the mobile device, whether the mobile device is suitable to enter an RRC inactive state; and
send state indication information of the mobile device to an access network device;
wherein the state indication information of the mobile device indicates to the access network device whether the mobile device is suitable to enter the RRC inactive state, and the RRC inactive state is different from an RRC connected state or an RRC idle state;
wherein
when the state indication information indicates that the mobile device is suitable to enter the RRC connected inactive state, the access network device determines that the mobile device is suitable to enter the RRC connected inactive state;
when the state indication information indicates that the mobile device is not suitable to enter the RRC connected inactive state, the access network device determines that the mobile device is suitable to enter the RRC idle state.

12. The apparatus according to claim 11, wherein the state indication information of the mobile device indicates whether all bearers, all network slices, or all service flows of the mobile device are suitable to enter the RRC inactive state.

13. The method according to claim 1, further comprising:
based on a determination that the mobile device is suitable to enter the RRC inactive state, storing, by the access network device, context information of the mobile device.

14. The method according to claim 5, wherein in case that the mobile device is determined to be suitable to enter the RRC inactive state, context information of the mobile device is stored for the mobile device.

15. The method according to claim 5, wherein the state indication information of the mobile device comprises an indicator, the indicator indicates whether the mobile device is or is not suitable to enter the RRC inactive state.

16. The apparatus according to claim 7, wherein the instructions further cause the apparatus to:
based on a determination that the mobile device is suitable to enter the RRC inactive state, store context information of the mobile device.

17. The apparatus according to claim 11, wherein in case that the mobile device is determined to be suitable to enter the RRC inactive state, context information of the mobile device is stored for the mobile device.

18. The apparatus according to claim 11, wherein the state indication information of the mobile device comprises an indicator, the indicator indicates whether the mobile device is or is not suitable to enter the RRC inactive state.

19. A communication system for controlling a radio resource control (RRC) state of a mobile device, comprising a core network device and an access network device, wherein
the core network device is configured to provide to the access network device, state indication information of the mobile device, the state indication information indicating whether the mobile device is suitable to enter an RRC inactive state, the RRC inactive state being different from an RRC connected state or an RRC idle state; and
the access network device is configured to determine, based on the state indication information, whether the mobile device is suitable to enter the RR C inactive state;
wherein
when the state indication information indicates that the mobile device is suitable to enter the RRC inactive state, the mobile device is determined to be suitable to enter the RRC connected inactive state;
when the state indication information indicates that the mobile device is not suitable to enter the RRC inactive state, the mobile device is determined to be suitable to enter the RRC idle state.

20. The communication system according to claim 19, wherein the state indication information comprises an indicator, and the indicator indicates that the mobile device is suitable to enter the RRC inactive state or the mobile device is not suitable to enter the RRC inactive state.

21. The communication system according to claim 19, wherein the state indication information of the mobile device indicates whether all bearers, all network slices, or all service flows of the mobile device are suitable to enter the RRC inactive state.

* * * * *